US009626083B2

(12) United States Patent
Lee et al.

(10) Patent No.: US 9,626,083 B2
(45) Date of Patent: Apr. 18, 2017

(54) MOBILE TERMINAL AND CONTROLLING METHOD OF A LOCKED SCREEN

(71) Applicant: LG Electronics Inc., Seoul (KR)

(72) Inventors: Jungbin Lee, Seoul (KR); Soyeon Yim, Seoul (KR); Jisun Lee, Seoul (KR); Jinwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 636 days.

(21) Appl. No.: 14/071,073

(22) Filed: Nov. 4, 2013

(65) Prior Publication Data

US 2014/0359454 A1 Dec. 4, 2014

(30) Foreign Application Priority Data

Jun. 3, 2013 (KR) ........................ 10-2013-0063394

(51) Int. Cl.
| | | |
|---|---|---|
| *G06F 3/0484* | (2013.01) | |
| *H04W 8/00* | (2009.01) | |
| *G06F 21/83* | (2013.01) | |
| *G06F 3/048* | (2013.01) | |
| *G06F 3/0488* | (2013.01) | |
| *H04M 1/725* | (2006.01) | |
| *H04W 4/00* | (2009.01) | |

(52) U.S. Cl.
CPC .......... *G06F 3/04842* (2013.01); *G06F 3/048* (2013.01); *G06F 3/0488* (2013.01); *G06F 21/83* (2013.01); *H04W 8/005* (2013.01); *G06F 2203/04808* (2013.01); *H04M 1/7253* (2013.01); *H04W 4/008* (2013.01)

(58) Field of Classification Search
CPC ............. H04L 12/2809; H04L 12/2803; H04L 63/0492; H04L 67/125; H04W 8/005; H04W 76/02; H04W 4/008; H04W 4/005; G06F 2203/04808; G06F 21/83; G06F 21/35; G06F 3/04842; G06F 3/0482; G06F 3/04817; G06F 21/31; G06F 3/048; G06F 3/14; G06F 3/1226; G06F 3/1292; G06F 13/00; G06F 3/0484; G06F 3/0486; H04M 1/72577
See application file for complete search history.

(56) References Cited

U.S. PATENT DOCUMENTS

| | | | | |
|---|---|---|---|---|
| 7,603,105 | B2 * | 10/2009 | Bocking ................. | H04M 1/67 455/411 |
| 8,136,053 | B1 * | 3/2012 | Miller ................ | G06F 3/04883 345/156 |
| 8,230,075 | B1 * | 7/2012 | Weskamp ............. | H04W 4/023 709/203 |
| 8,726,171 | B1 * | 5/2014 | Lachapelle ..... | H04M 1/274558 715/751 |
| 8,847,903 | B2 * | 9/2014 | Stokes ................... | G06F 21/31 345/156 |

(Continued)

FOREIGN PATENT DOCUMENTS

JP  EP 2685375 A1 * 1/2014 ............. G06F 9/465

*Primary Examiner* — Nicholas Ulrich
(74) *Attorney, Agent, or Firm* — Lee, Hong, Degerman, Kang & Waimey

(57) ABSTRACT

A mobile terminal and controlling method thereof are provided. If a screen of a touchscreen is locked, at least communication-connectable external device is automatically found and the found external device is displayed on the locked screen. Accordingly, both of the unlocking of the locked screen and the communication connection to the found external device can be simultaneously performed in response to a user's touch gesture.

21 Claims, 25 Drawing Sheets

(a)

(b)

(56) References Cited

U.S. PATENT DOCUMENTS

| | | | |
|---|---|---|---|
| 9,002,270 B1* | 4/2015 | Hewinson | H04B 5/0031 340/572.1 |
| 2007/0300063 A1* | 12/2007 | Adams | G06F 21/35 713/168 |
| 2010/0178873 A1* | 7/2010 | Lee | H04M 1/7253 455/41.3 |
| 2010/0269040 A1* | 10/2010 | Lee | G06F 3/04817 715/702 |
| 2011/0175822 A1* | 7/2011 | Poon | G06F 3/04842 345/173 |
| 2012/0036556 A1* | 2/2012 | LeBeau | G06F 3/048 726/3 |
| 2012/0081287 A1* | 4/2012 | Kim | G06F 9/44 345/168 |
| 2012/0115549 A1* | 5/2012 | Kim | H02J 7/0047 455/566 |
| 2013/0169573 A1* | 7/2013 | Nishio | G06F 3/04883 345/173 |
| 2013/0187753 A1* | 7/2013 | Chiriyankandath | G06F 3/0488 340/5.51 |
| 2013/0283199 A1* | 10/2013 | Selig | G06F 3/0484 715/781 |
| 2013/0283212 A1* | 10/2013 | Zhu | G06F 3/0486 715/846 |
| 2013/0346921 A1* | 12/2013 | Shiplacoff | G06F 3/0488 715/835 |
| 2014/0058941 A1* | 2/2014 | Moon | G06Q 20/322 705/42 |
| 2014/0282967 A1* | 9/2014 | Maguire | H04W 36/18 726/7 |
| 2014/0342670 A1* | 11/2014 | Kang | H04W 24/08 455/41.2 |

\* cited by examiner

FIG. 4
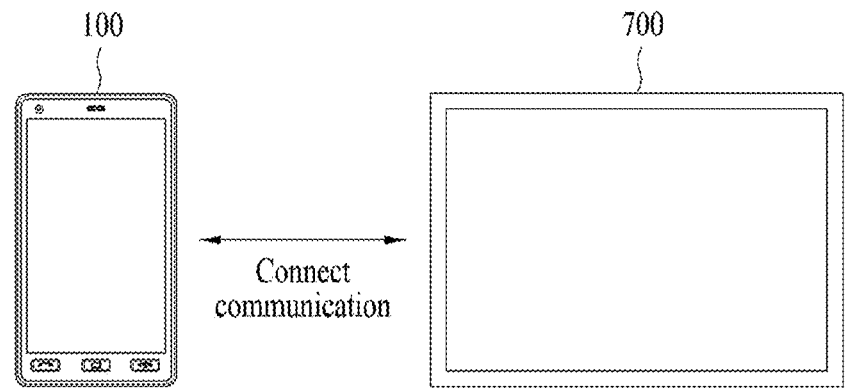
(a)
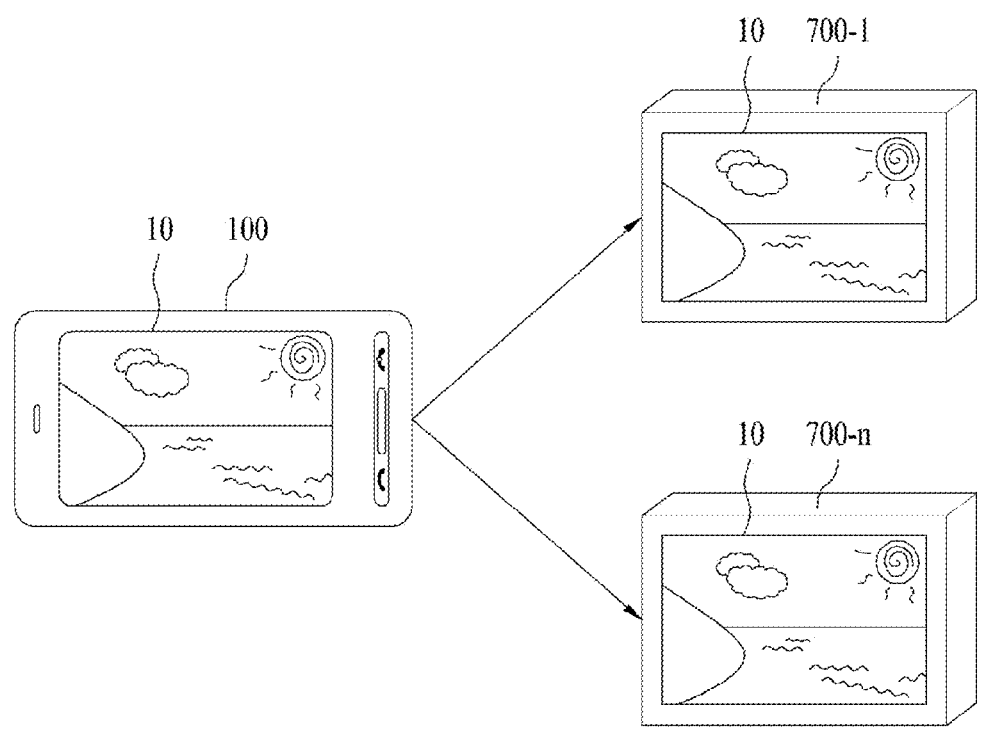
(b)

FIG. 8
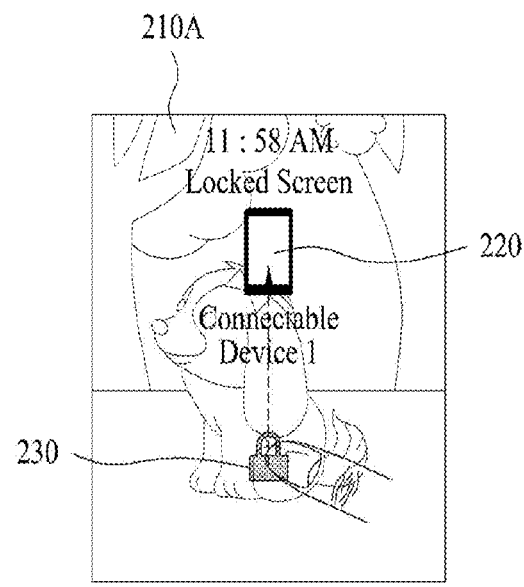
(a)
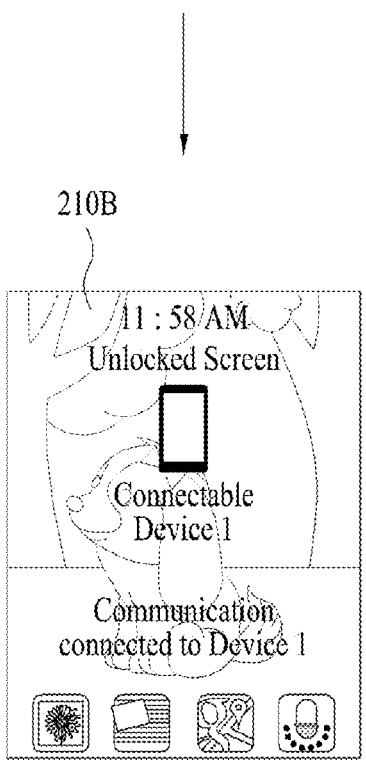
(b)

FIG. 10
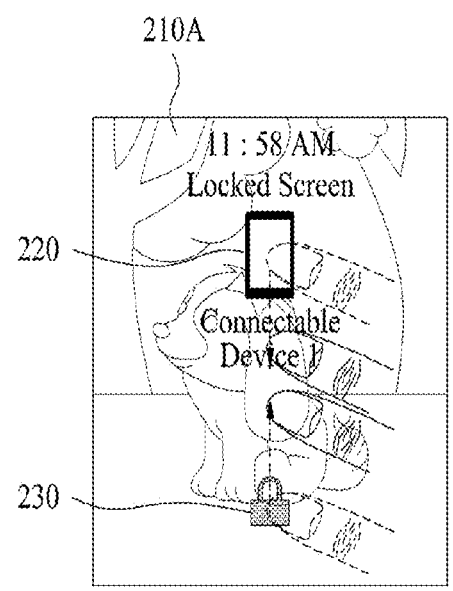
(a)
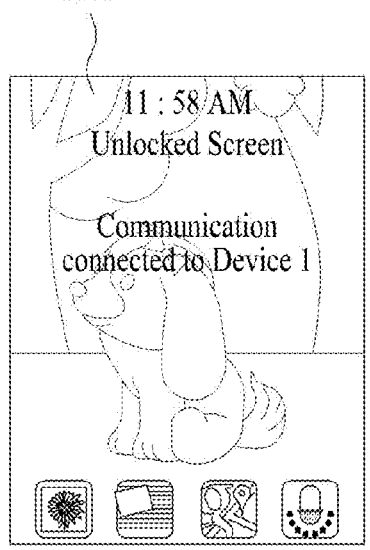
(b)

FIG. 11
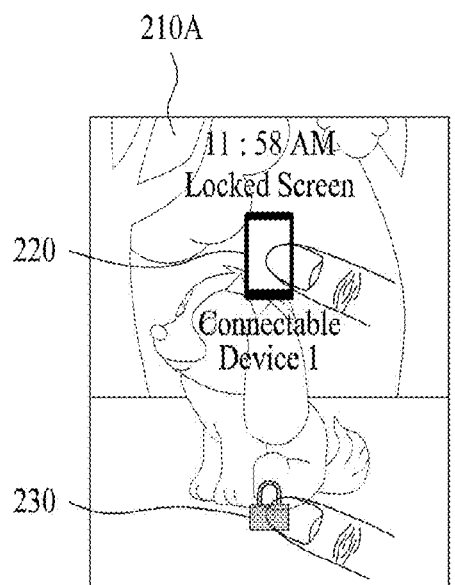
(a)
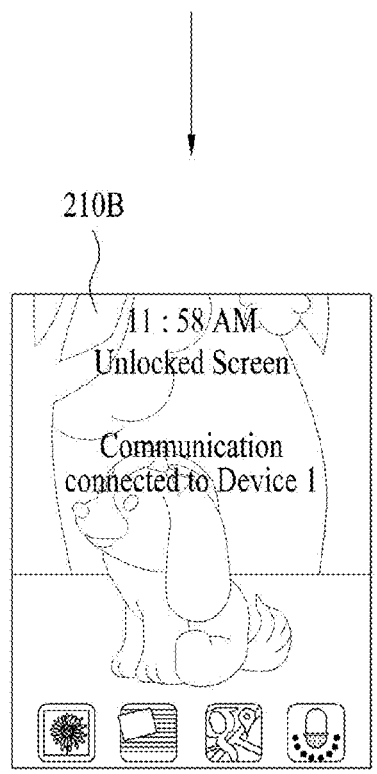
(b)

FIG. 12
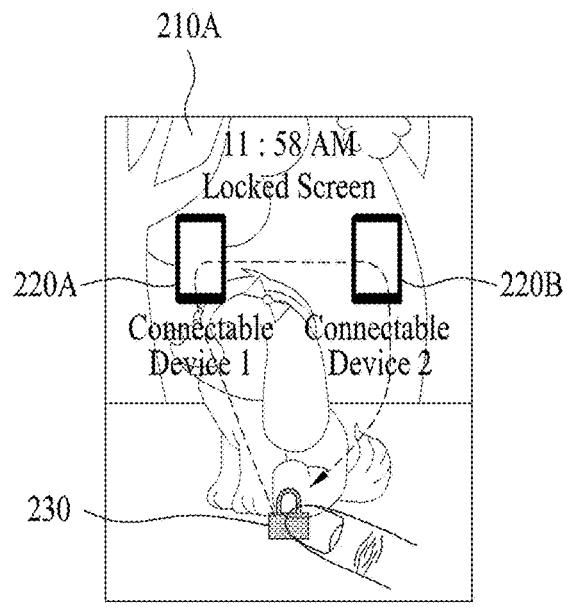
(a)
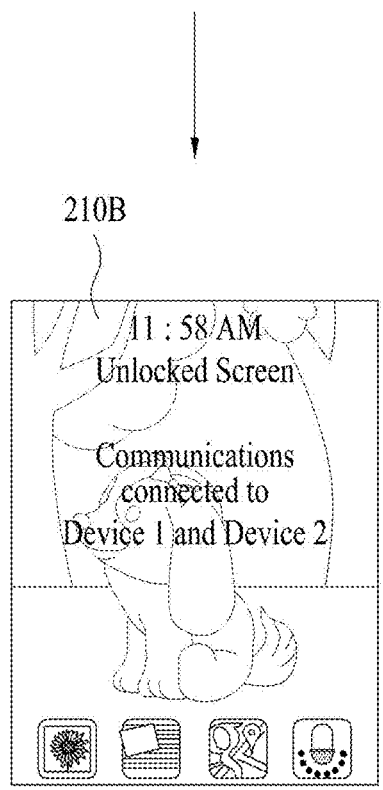
(b)

FIG. 13
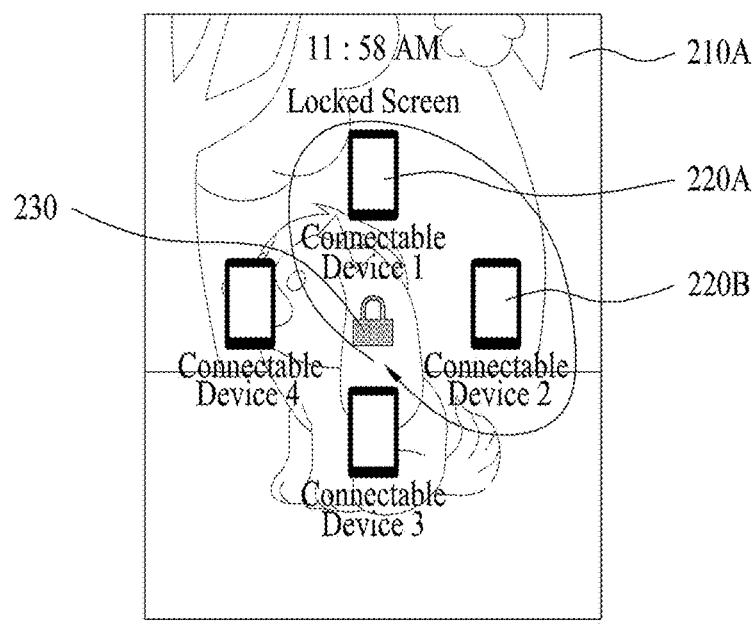
(a)
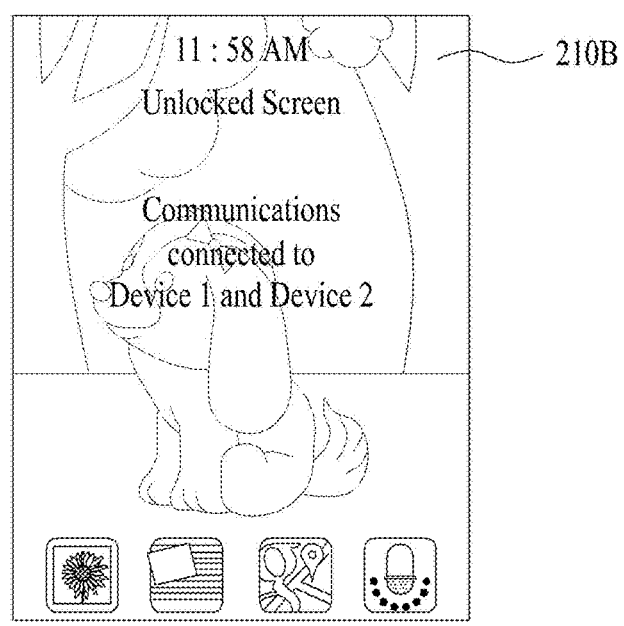
(b)

FIG. 15
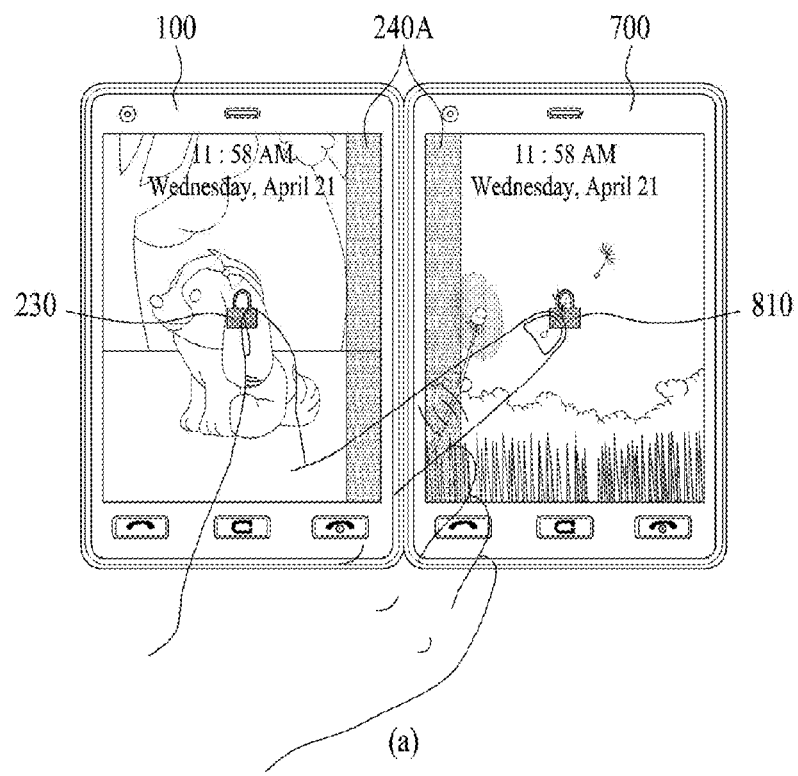
(a)
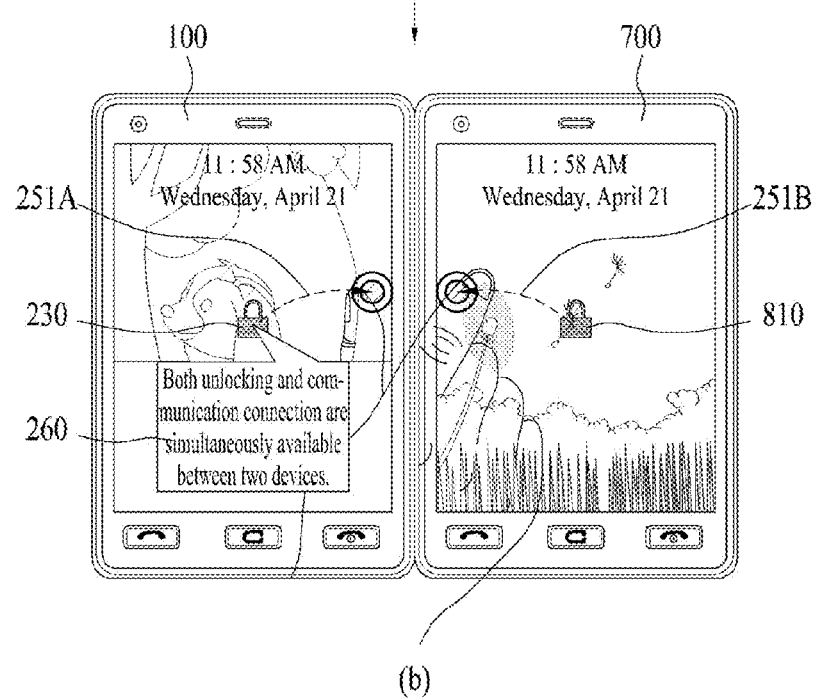
(b)

FIG. 16
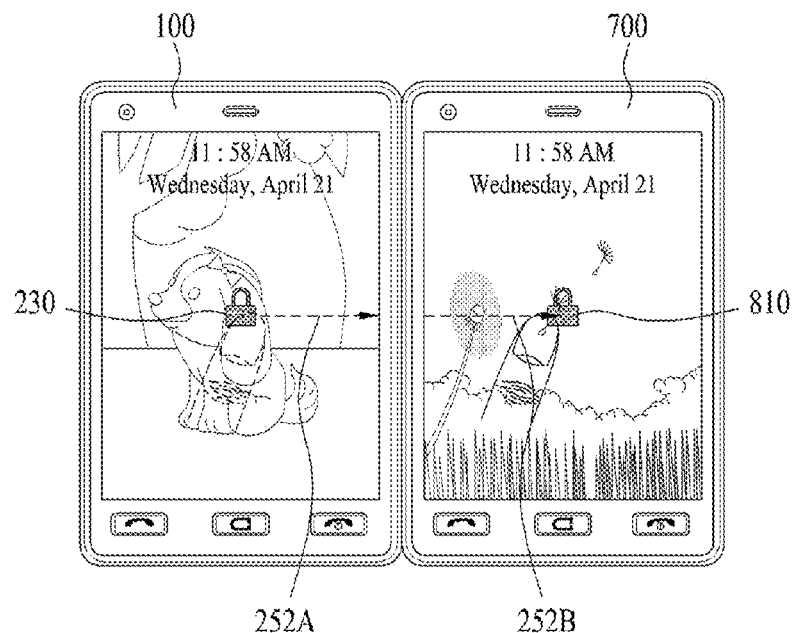
(a)
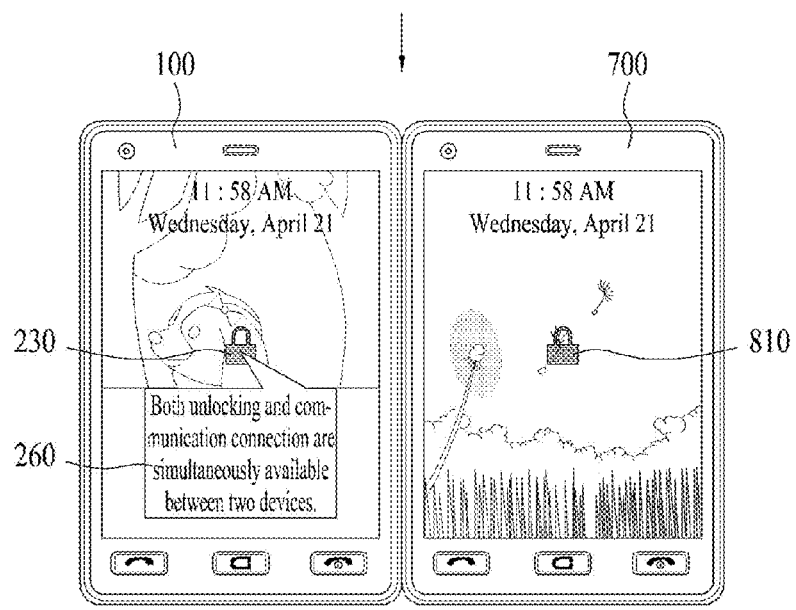
(b)

MOBILE TERMINAL AND CONTROLLING METHOD OF A LOCKED SCREEN

Pursuant to 35 U.S.C. §119(a), this application claims the benefit of earlier filing date and right of priority to Korean Application No. 10-2013-0063394, filed on Jun. 3, 2013, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Generally, in a mobile terminal provided with a touchscreen, it is able to unlock a locked screen by touching a UI (user interface), which is displayed on a locked screen on the touchscreen, for unlocking a screen or by manipulating a touch lock button.

While a screen is locked, a user-set information, a current hour and the like are displayed on the locked screen. In doing so, however, in order to connect a communication with an external device, a user unlocks the locked screen, enters a menu for a communication connection to the external device, searches for connectable external devices, and then connects the communication with a desired one of the found external devices. Thus, it is inconvenient for the user to perform the above-mentioned steps.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof. In particular, if a screen of a touchscreen is locked, the present invention automatically searches for at least one communication-connectable external devices and then displays the found at least one communication connectable external device on the locked screen. In doing so, if a user performs a touch gesture on the touchscreen, the locked screen can be unlocked and a communication with the found external device can be connected as well.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a wireless communication unit, a touchscreen configured to display a locked screen, and a controller configured to, when at least one communication-connectable external device is searched by a search via the wireless communication unit while the locked screen is maintained, display an item indicating the found external device within the locked screen, the controller controlling the locked screen to be unlocked in response to a touch gesture inputted to the locked screen, and to control a communication with the external device corresponding to the item.

In another aspect of the present invention, a method of controlling a mobile terminal according to the present invention may include the steps of displaying a locked screen on a touchscreen, searching at least one communication-connectable external device while the locked screen is maintained, displaying an item indicating the searched external device within the locked screen, in response to an input of a touch gesture on the locked screen, unlocking the locked screen, and connecting a communication with the external device corresponding to the item.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 4 is a diagram of a system including a mobile terminal and at least one external device according to one embodiment of the present invention;

FIGS. 6 to 25 are diagrams to describe a mobile terminal operating process according to the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
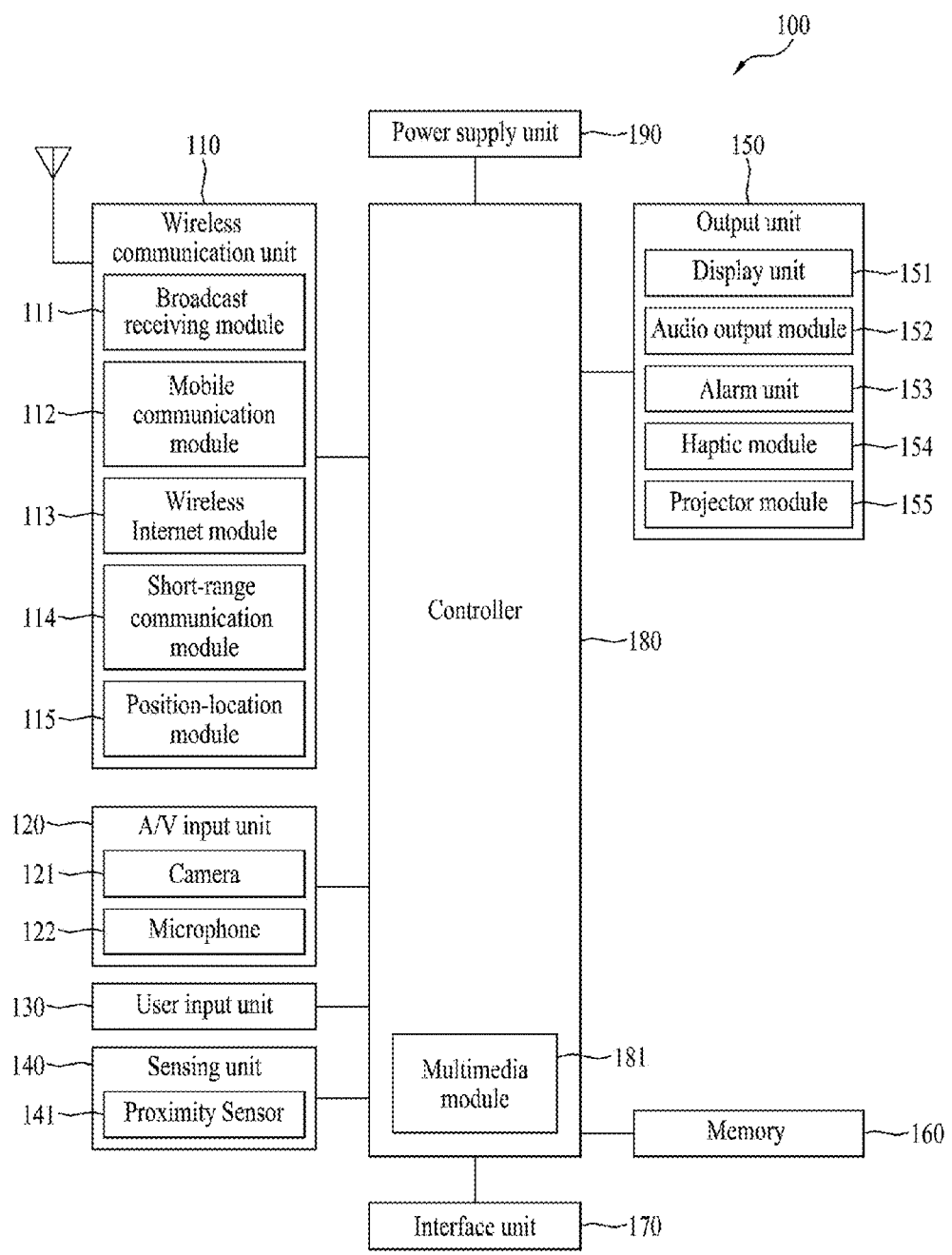
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

Moreover, according to the present invention, if a screen of the touchscreen 151 is locked, the wireless communication unit 110 searches for at least one or more communication-connectable external devices and then outputs the corresponding search result to the controller 180, under the control of the controller 180.

In particular, under the control of the controller 180, the wireless communication unit 110 connects a communication with a prescribed one of the found external devices, transmits data saved in the mobile terminal 100 to the communication-connected external device, and receives data from the communication-connected external device.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (Media-FLO) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

Moreover, according to the present invention, if a screen of the touchscreen 151 is locked, the mobile communication module 112 searches for at least one or more communication-connectable external devices and then outputs the corresponding search result to the controller 180, under the control of the controller 180.

In particular, under the control of the controller 180, the mobile communication module 112 connects a communication with a prescribed one of the found external devices, transmits data saved in the mobile terminal 100 to the communication-connected external device, and receives data from the communication-connected external device.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro), World Interoperability for Microwave Access (WiMAX), or High Speed Downlink Packet Access (HSDPA).

Moreover, as mentioned in the foregoing description, the wireless internet module 113 can receive or download the data relevant to the area, in which the mobile terminal 100 is located, from the external server.

Moreover, according to the present invention, if a screen of the touchscreen 151 is locked, the wireless internet module 113 searches for at least one or more communication-connectable external devices and then outputs the corresponding search result to the controller 180, under the control of the controller 180.

In particular, under the control of the controller 180, the wireless internet module 113 connects a communication with a prescribed one of the found external devices, transmits data saved in the mobile terminal 100 to the communication-connected external device, and receives data from the communication-connected external device.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth or ZigBee.

Moreover, according to the present invention, if a screen of the touchscreen 151 is locked, the short range communication module 114 searches for at least one or more communication-connectable external devices and then outputs the corresponding search result to the controller 180, under the control of the controller 180.

In particular, under the control of the controller 180, the short range communication module 114 connects a communication with a prescribed one of the found external devices, transmits data saved in the mobile terminal 100 to the communication-connected external device, and receives data from the communication-connected external device.

The position-location module 115 identifies or otherwise obtains the location of the mobile terminal 100. In one embodiment, the position-location module 115 can include a global positioning system (GPS) module.

The AN input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
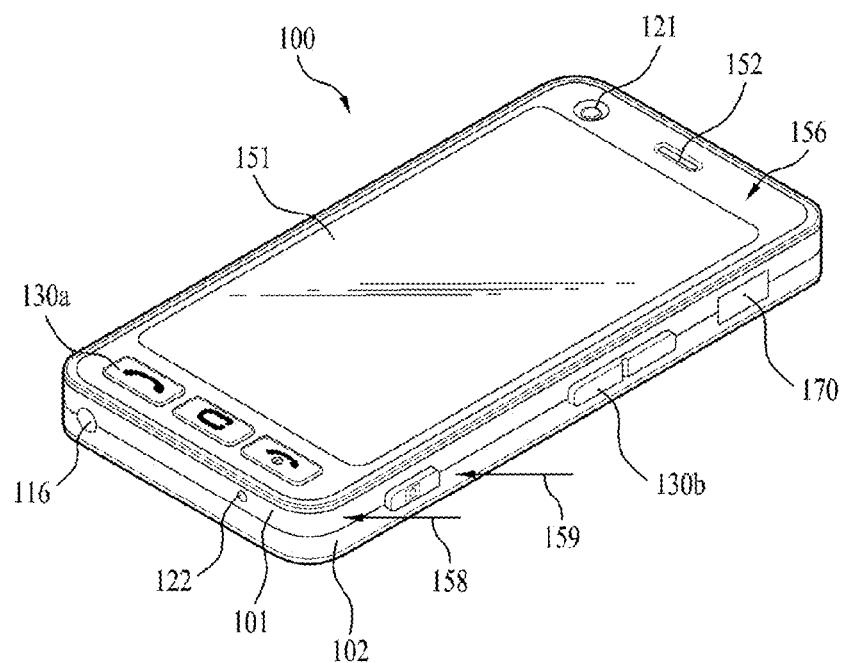
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
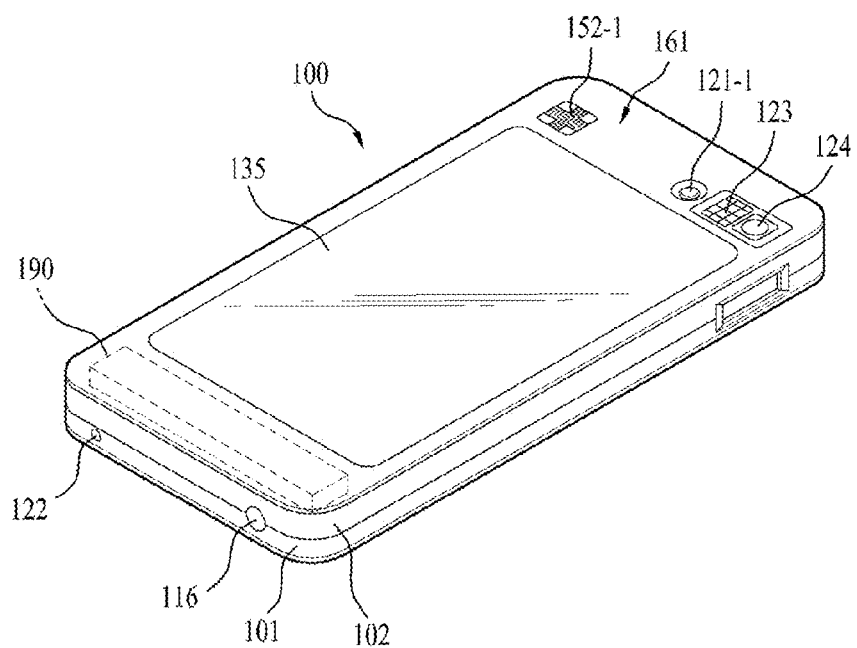
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

A following process according to the present invention shall be described in detail with reference to FIGS. 3 to 25 as follows. In particular, in the following process according to the present invention, at least one communication-connectable external devices are found by an automatic search and then displayed on the locked screen. In doing so, if a user performs a touch gesture on the touchscreen, the locked screen can be unlocked and a communication with at least one of the found external devices can be connected as well.

Figure 3:
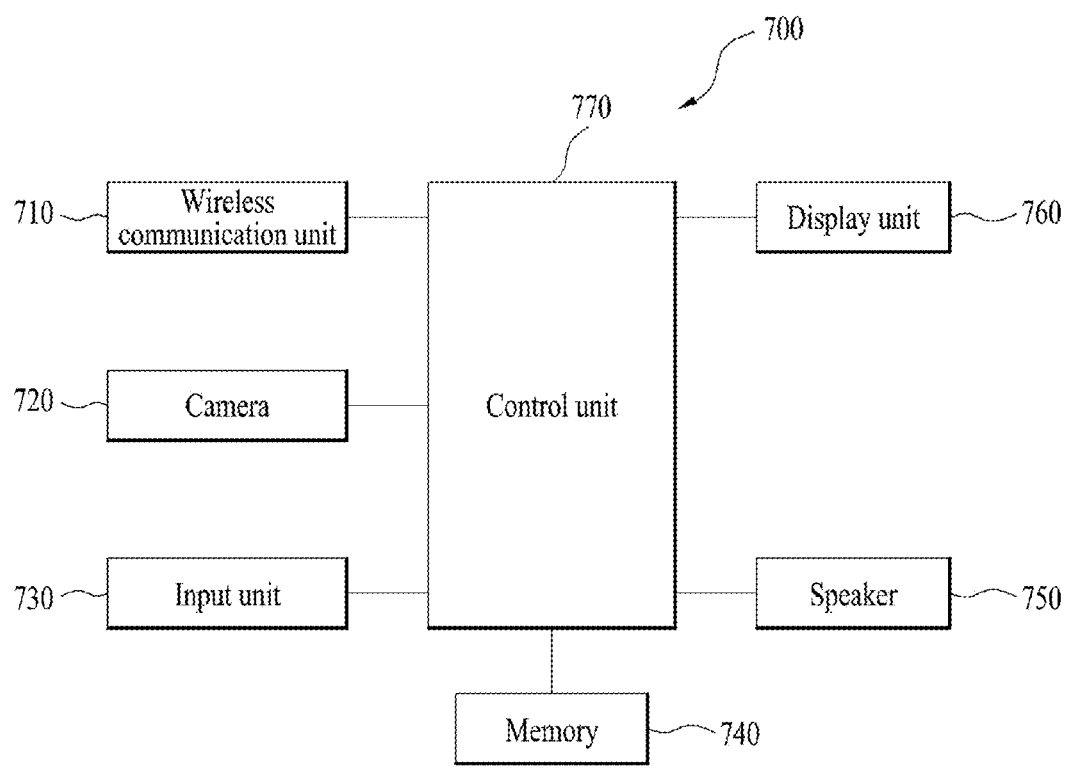
FIG. 3 is a block diagram of an external device related to one embodiment of the present invention.

First of all, with reference to FIG. 3, a configuration of an external device 700 is described in detail. In this case, the external device connects a communication with the mobile terminal 100 of the present invention, outputs data received from the mobile terminal 100, and/or performs a corresponding operation in response to a command signal received from the mobile terminal 100.

FIG. 3 is a block diagram of an external device related to one embodiment of the present invention.

Referring to FIG. 3, an external device 700 according to the present invention may include a wireless communication unit 710, a camera 720, an input unit 730, a memory 740, a speaker 750, a display unit 760, a control unit 770 and the like.

Of course, the external device 700 may further include at least one of the components (e.g., microphone, interface unit, etc.) of the mobile terminal 100 mentioned in the description of the mobile terminal 100.

The wireless communication unit 710 is communication-connected to the mobile terminal 100 according to the present invention and can receive data, which are to be displayed on or outputted to the external device 700, from the mobile terminal 100. In this case, the data received from the mobile terminal 100 may include at least one of a video data of an active screen of a function activated in the mobile terminal 100 and a video/audio data of a content played or running in the mobile terminal 100.

The wireless communication unit 710 can receive a signal for commanding an activation of a specific function provided to the external device 700 and a transmission of a screen image data of the activated function.

The above-configured wireless communication unit 710 can include such a module configured to enable a communication between the mobile terminal 100 and the external device 700 as a mobile communication module, a wireless internet module and a short range communication module like the former wireless communication unit 110 of the mobile terminal 100 shown in FIG. 1.

For instance, the mobile terminal 100 and the external device 700 can communication-connected to each other by one of communication systems including a mobile communication, a wireless internet communication, Bluetooth, DLNA and the like.

The camera 720 processes video frames of a still image or video obtained by an image sensor in a video call mode or a photographing mode. The processed video frames may be displayed on the display unit 760. Moreover, the camera 720 may be activated in response to a command signal received from the mobile terminal 100 via the wireless communication unit 110. In this case, a preview image inputted after the activation of the camera 720 may be transmitted to the mobile terminal 100 via the wireless communication unit 710. At least two cameras 121 may be provided in response to a use environment.

The input unit 730 generates a key signal for an operation control of the external device 700. The input unit 730 can include at least one of a keypad, a dome switch, a touchpad (static pressure or electrostatic), a jog wheel, a jog switch, a mouse and the like.

The memory 740 can store programs for operations of the external device 700. And, various kinds of data including video files, audio files, image files and the like can be saved in the memory 740.

The speaker 750 outputs an audio file saved in the memory 740 and/or audio data received from the mobile terminal 100 via the wireless communication unit 710.

The display unit 760 displays information processed by the external device 700. The display unit 760 may include at least one of a liquid crystal display (LCD), a thin film transistor liquid crystal display (TFT LCD), an organic light-emitting diode (OLED), a flexible display, a 3-dimensional (3D) display and the like. Moreover, the display unit 760 may be coupled with a touch sensor to configure a touchscreen.

The display unit 760 displays image data received from the mobile terminal 100 on a screen.

The control unit 770 controls overall operations of the external device 700. According to the present invention, the control unit 770 controls the image data received from the mobile terminal 100 to be displayed on the screen of the display unit 770. The control unit 770 activates a corresponding function in response to a command signal received from the mobile terminal 100 and can transmit image and/or audio data of the activated function to the mobile terminal 100 via the wireless communication unit 710.

So far, the configuration of the external device 700 according to the present invention is described.

In the following description, a communication connection and a data sharing between the above-configured mobile terminal 100 and external device 700 are explained with reference to FIG. 4.

FIG. 4 is a diagram of a system including a mobile terminal and at least one external device according to one embodiment of the present invention.

First of all, FIG. 4 (a) shows a system including a mobile terminal 100 and an external device 700.

Referring to FIG. 4 (a), according to the present invention, while a screen of the touchscreen 151 is locked, if a communication-connectable external device 700 is found by search, the mobile terminal 100 displays an item indicating the found external device 700 on the locked screen. If a user's touch gesture is inputted to the locked screen, the mobile terminal 100 unlocks the locked screen and also connects a communication with the external device 700 corresponding to the item at the same time. And, the mobile terminal can transmit at least one of an image data displayed on the screen of the mobile terminal 100, an image/audio data of a function activated in the mobile terminal 100 and a command signal for the mobile terminal 100 to control an operation of the external device 700 to the external device 700.

For instance, the mobile terminal 100 and the external device 700 can connect a communication with each other by one of wireless communication including a mobile communication, a wireless internet communication and a short range communication. In doing so, if the short range communication is used, the mobile terminal 100 and the external device 700 can connect a communication with each other by one of the short range systems including Bluetooth and DLNA.

Referring to FIG. 4 (b), the mobile terminal 100 finds at least two external devices 700-1 to 700-n by search and can connect communications with at least one or two of the found external devices 700-1 to 700-n.

For instance, the mobile terminal 100 and each of the external devices 700-1 to 700-n can connect a communication with each other by one wireless communication selected from a mobile communication, a wireless internet communication and a short range communication. In doing so, if the short range communication is used, the mobile terminal 100 and each of the external devices 700-1 to 700-n can connect a communication with each other by one of the short range systems including Bluetooth and DLNA.

A following process according to the present invention shall be described in detail with reference to FIGS. 5 to 25 as follows. In particular, in the following process according to the present invention, at least one communication-connectable external devices are found by an automatic search and then displayed on the locked screen. In doing so, if a user performs a touch gesture on the touchscreen, the locked screen can be unlocked and a communication with at least one of the found external devices can be connected as well.

Figure 5:
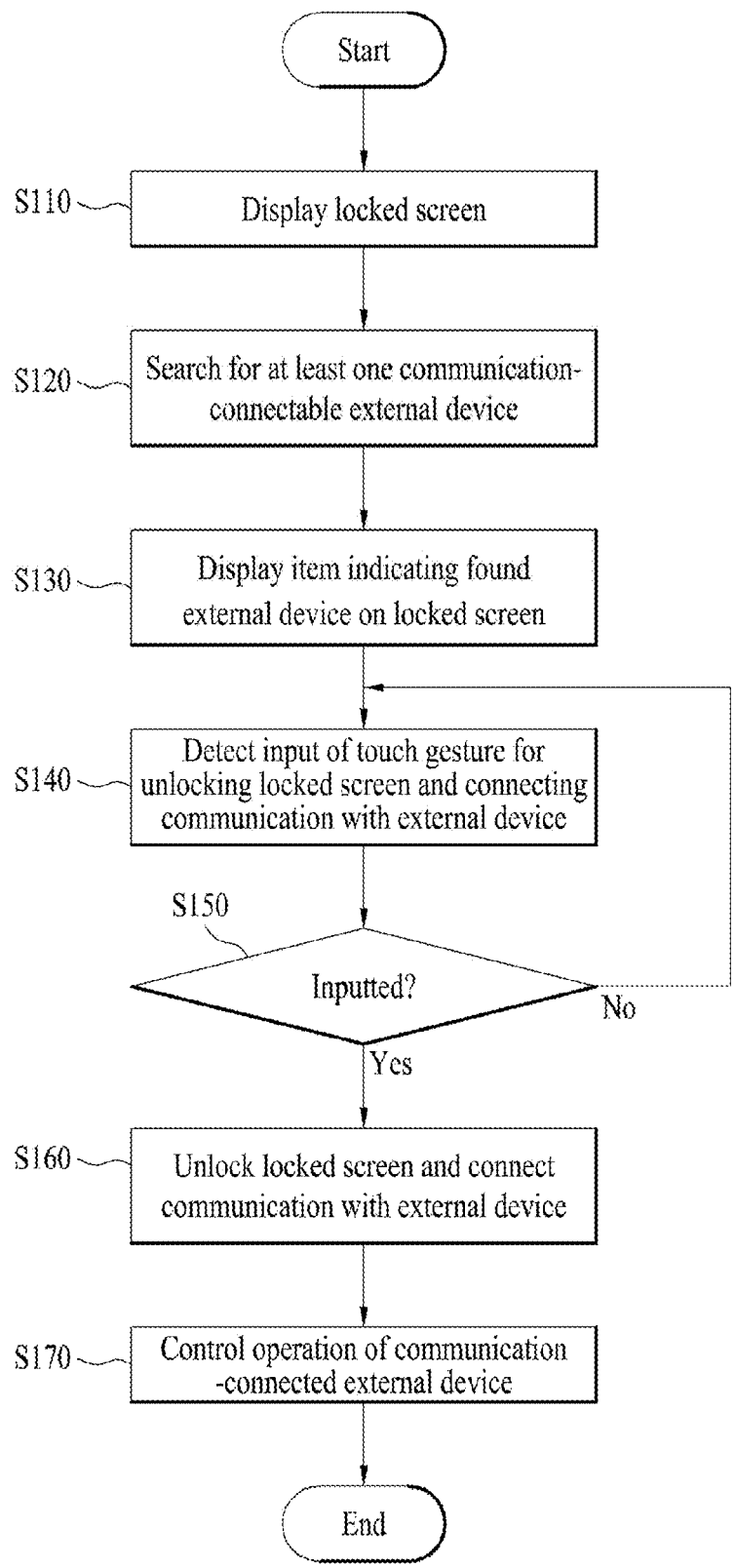
FIG. 5 is a flowchart of a mobile terminal operating process according to the present invention.

FIG. 5 is a flowchart of a mobile terminal operating process according to the present invention.

FIGS. 6 to 25 are diagrams to describe a mobile terminal operating process according to the present invention.

Referring to FIGS. 5 to 25, if the mobile terminal 100 is not used by a user's manipulation or for a predetermined duration, the controller 180 of the mobile terminal 100 locks a screen of the touchscreen 151 and displays the locked screen [S110].

In this case, in spite of inputting a specific touch to the locked screen until inputting a user-set touch gesture for unlocking the locked screen, a key signal for unlocking the locked screen or a password for unlocking the locked screen, the locked screen means an operating state of ignoring the inputted touch.

If the screen of the touchscreen 151 is locked, the controller 180 searches for at least one communication-connectable external device via the wireless communication unit 110 [S120] and then displays an item indicating the found at least one external device on the locked screen [S130]. In this case, the item may have a combined configuration of at least one or two of a text indicating the found external device, an image indicating the found external device and an icon indicating the found external device.

The controller 180 detects whether a touch gesture for an unlock of the locked screen and a communication connection to the found external device is inputted to the locked screen via the touchscreen 151 [S140].

If the touch gesture is detected as inputted via the touchscreen 151 [S150], the controller 180 unlocks the locked screen and connects the communication with the found external device simultaneously [S160]. The controller 180 then controls an operation of the communication-connected external device [S170].

In the following description, the steps S140 and S160 shown in FIG. 5 are explained in detail with reference to FIGS. 6 to 17.

Figure 6:
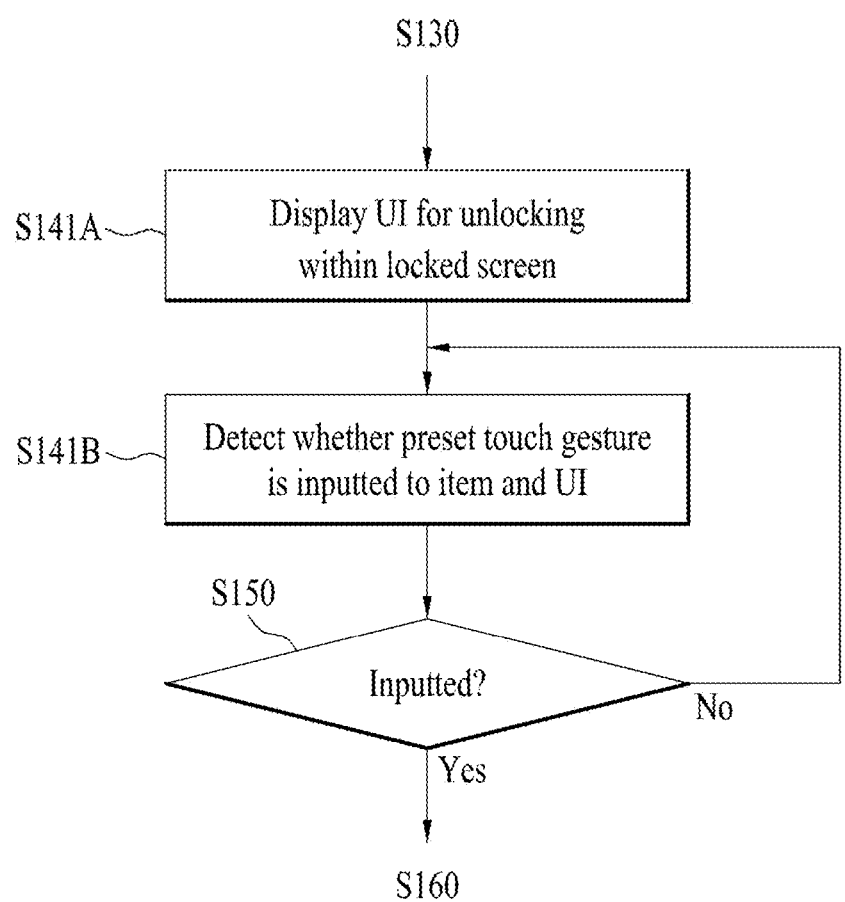

Referring to FIG. 6, if the item 220 indicating the found external device is displayed on the locked screen 210A, the controller 180 controls the UI 230 for unlock to be displayed within the locked screen 210A [S141A].

In this case, the UI 230, as shown in FIGS. 7 to 17, is displayed as a lock shape. Alternatively, the UI 230 may be displayed as another shape in accordance with user's settings.

Figure 7:
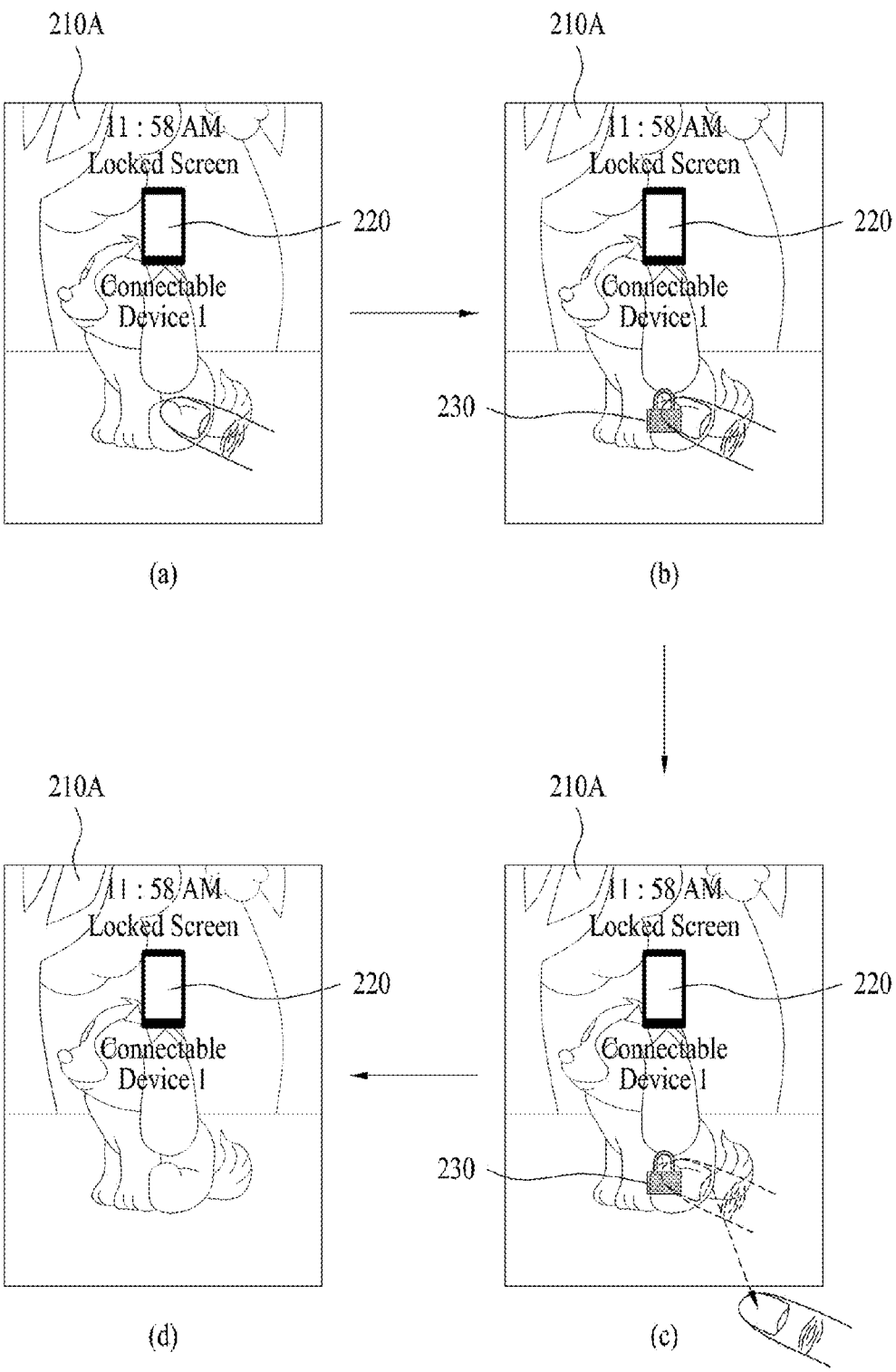

Moreover, referring to FIG. 7, if a specific point of a displayed region of the locked screen 210A including the item 220 except the item 220 is touched, the controller 180 controls the UI 230 to be displayed on the touched specific point. If the touch to the specific point is released, the controller 180 may not display the UI 230.

In particular, referring to FIG. 7 (a), a specific point of a displayed region of the locked screen 210A including the item 220 except a displayed region of the item 220 is touched. If the touch is maintained, referring to FIG. 7 (b), the controller 180 may control the UI 230 to be displayed on the touched specific point.

While the UI 230 is displayed on the touch-maintained specific point, if the touch to the specific point is released [FIG. 7 (c)], the controller 180 may stop displaying the UI 230 [FIG. 7 (d)].

Referring now to FIG. 6, while the item 220 and the UI 230 are displayed within the locked screen 210A, the controller 180 detects whether a preset touch gesture is inputted between a $1^{st}$ region for displaying the item 220 thereon and a $2^{nd}$ region within the locked screen 210A except the $1^{st}$ region [S141B].

In this case, the preset touch gesture may include the touch gesture for the unlock of the locked screen and the communication connection to the external device corresponding to the item 220, as mentioned in the foregoing description with reference to FIG. 5.

For instance, referring to FIG. 8, the preset touch gesture may include a touch gesture performed in a manner of touching the UI 230 and then dragging the YI 230 to the item 220.

In particular, while the UI 230 is touched, if a touch gesture of dragging the UI-touched point into the displayed region of the item 220 is inputted [FIG. 8 (a)], the controller 180 unlocks the locked screen 210A into an unlocked screen 210B and also connects the communication with the external device corresponding to the item 220 at the same time [FIG. 8 (b)].

Figure 9:
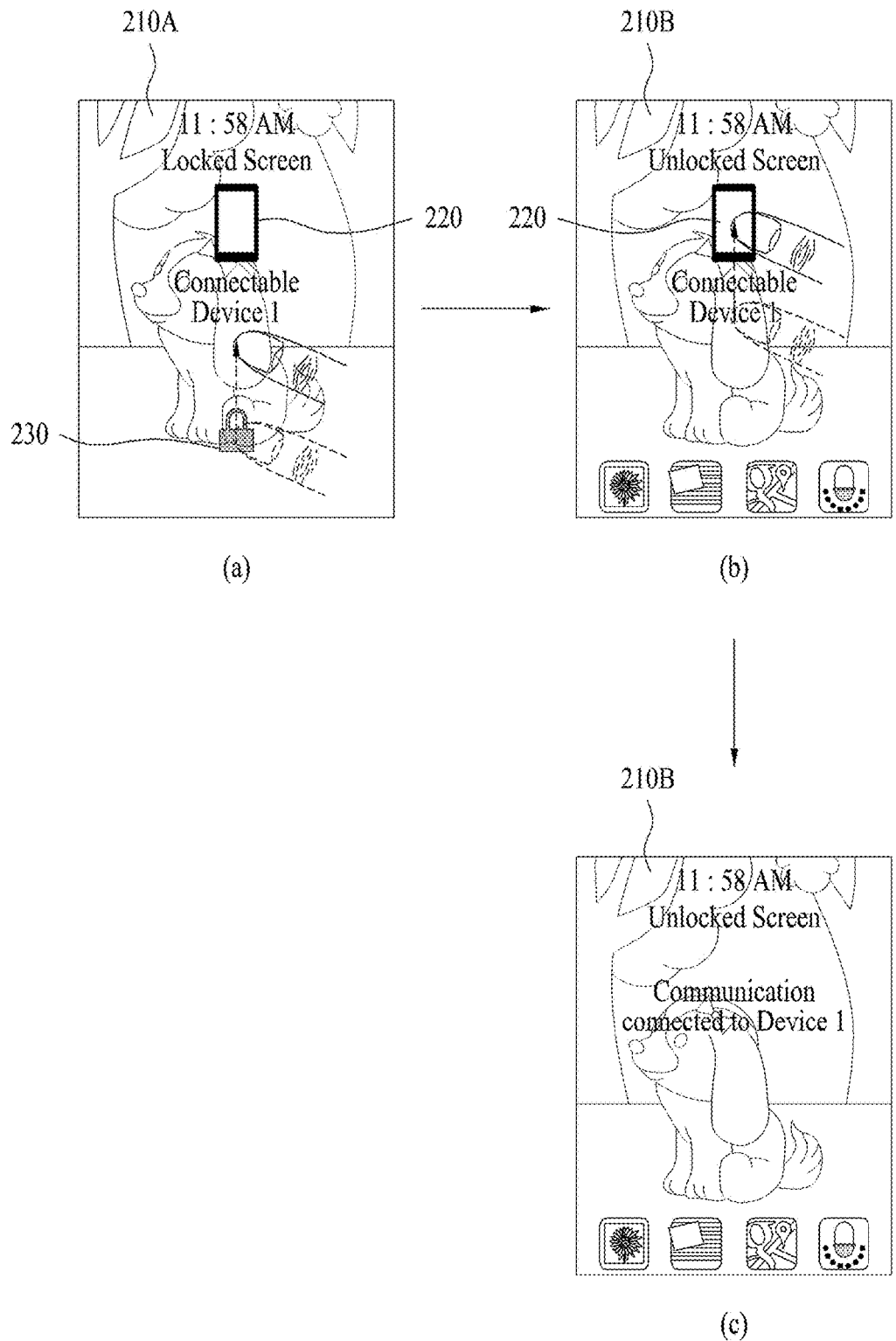

In doing so, referring to FIG. 9, if the UI-touched point is dragged to a different region other than the displayed region of the item 220, the controller 180 can unlock the locked screen 210A into the unlocked screen 210B only without connecting the communication with the external device corresponding to the item 220.

In particular, while the UI 230 is touched, if the UI-touched point is dragged to a prescribed region different from a displayed region of the item 220 by a distance equal to or greater than a preset distance [FIG. 9 (a)], the controller 180 unlocks the locked screen 210A into the unlocked screen 210B only [FIG. 9 (b)]. If the touch used to be maintained to the prescribed region is dragged to the displayed region of the item 220, the controller 180 connects the communication with the external device corresponding to the item 220.

For another instance, referring to FIG. 10, the preset touch gesture may include a pinching-in touch gesture performed in a manner that a distance between the touched point of the item 220 and the touched point of the UI 230 is decreased into a distance within the preset distance in a state that both of the item 220 and the UI 230 are being touched.

In particular, while both of the item 220 and the UI 230 are being touched, if a pinching-in touch gesture performed in a manner of decreasing a distance between a $1^{st}$ point (i.e., a touched point of the item 220) and a $2^{nd}$ point (i.e., a touched point of the UI 230) into a range of the preset distance is inputted [FIG. 10 (a)], the controller 180 unlocks the locked screen 210A into the unlocked screen 210B and also connects the communication with the external device corresponding to the item 220 at the same time [FIG. 10 (b)].

On the other hand, while both of the item 220 and the UI 230 are being touched, if a distance between a $1^{st}$ point (i.e., a touched point of the item 220) and a $2^{nd}$ point (i.e., a touched point of the UI 230) is decreased into a range of a $1^{st}$ preset distance d1, the controller 180 can unlock the locked screen 210A into the unlocked screen 210B without connecting the communication with the external device corresponding to the item 220.

Moreover, while the screen of the touchscreen 151 is unlocked, if the distance between the $1^{st}$ point and the $2^{nd}$ point is decreased into a range of a $2^{nd}$ preset distance d2 (where, d1>d2) within the $1^{st}$ distance d1, the controller 180 connects the communication with the external device corresponding to the item 220.

For another instance, referring to FIG. 11, the preset touch gesture may include a long touch performed on each of the item 220 and the UI 230.

In particular while both of the item 220 and the UI 230 are being touched, if the touch to the item 220 and the touch to the UI 230 are maintained for preset duration [FIG. 11 (a)], the controller 180 unlocks the locked screen 210A into the unlocked screen 210B and also connects the communication with the external device corresponding to the item 220 at the same time [FIG. 11 (b)].

For another instance, referring to FIG. 12, the preset touch gesture may include a swipe touch gesture performed between the item 220 and the UI 230.

Referring to FIG. 12, while the screen is locked, as at least two external devices have been found by a search, $1^{st}$ and $2^{nd}$ items 220A and 220B respectively indicating the at least two external devices are displayed on the locked screen 210A.

In particular, after the UI 230 has been touched, while the touch to the UI 230 is maintained, if a swipe touch gesture, which is performed in a manner of returning to the UI 230 from the UI touched point via a displayed region of the $1^{st}$ item 220A and a displayed region of the $2^{nd}$ item 220A, is inputted [FIG. 12 (a)], the controller 180 unlocks the locked screen 210A into the unlocked screen 210B and also connects communications with the external devices respectively corresponding to the $1^{st}$ item 220A and the $2^{nd}$ item 220B at the same time [FIG. 12 (b)].

On the other hand, while the screen is locked, as one external device has been found by a search, when the $1^{st}$ item 220A is displayed on the locked screen 210A only, if a swipe touch gesture, which is performed in a manner of returning to the UI 230 from the UI touched point via a displayed region of the $1^{st}$ item 220A, is inputted, as shown in FIG. 12, the controller 180 unlocks the locked screen 210A into the unlocked screen 210B and also connects a communication with the external device corresponding to the 1$^{st}$ item 220A at the same time.

For another instance, referring to FIG. 13, the preset touch gesture may include a touch gesture for designating a region including the 1$^{st}$ item 220 and the UI 230.

Referring to FIG. 13, while the screen is locked, as at least two external devices have been found by a search, at least two items 2 respectively indicating the at least two external devices are displayed on the locked screen 210A.

In particular, if a touch gesture for designating a region including the UI 230 and the at least two items 220A and 220B is inputted [FIG. 13 (a)], the controller 180 unlocks the locked screen 210A into the unlocked screen 210B and also connects communications with the external devices corresponding to the items 220A and 220B included in the designated region at the same time.

On the other hand, if a touch gesture for designating a region including the UI 230 and one item is inputted, the controller 180 unlocks the locked screen 210A into the unlocked screen 210B and also connects a communication with the external device corresponding to the item included in the designated region at the same time.

Moreover, if a touch gesture for designating a region including the UI 230 only is inputted, the controller 180 unlocks the locked screen 210A into the unlocked screen 210B only.

In the following description, referring to FIG. 14, the controller 180 configures at least two locked screens in accordance with the number of the found external devices, places an item indicating the found external device not in a currently displayed one of the at least two locked screens but in the other locked screen, and displays a guide information for guiding a location of the other locked screen, at which the item is located, on the currently displayed locked screen.

If a user switches the current locked screen to the other locked screen at which the item is located, the controller 180 unlocks the other locked screen and connects a communication with the external device corresponding to the item.

Figure 14:
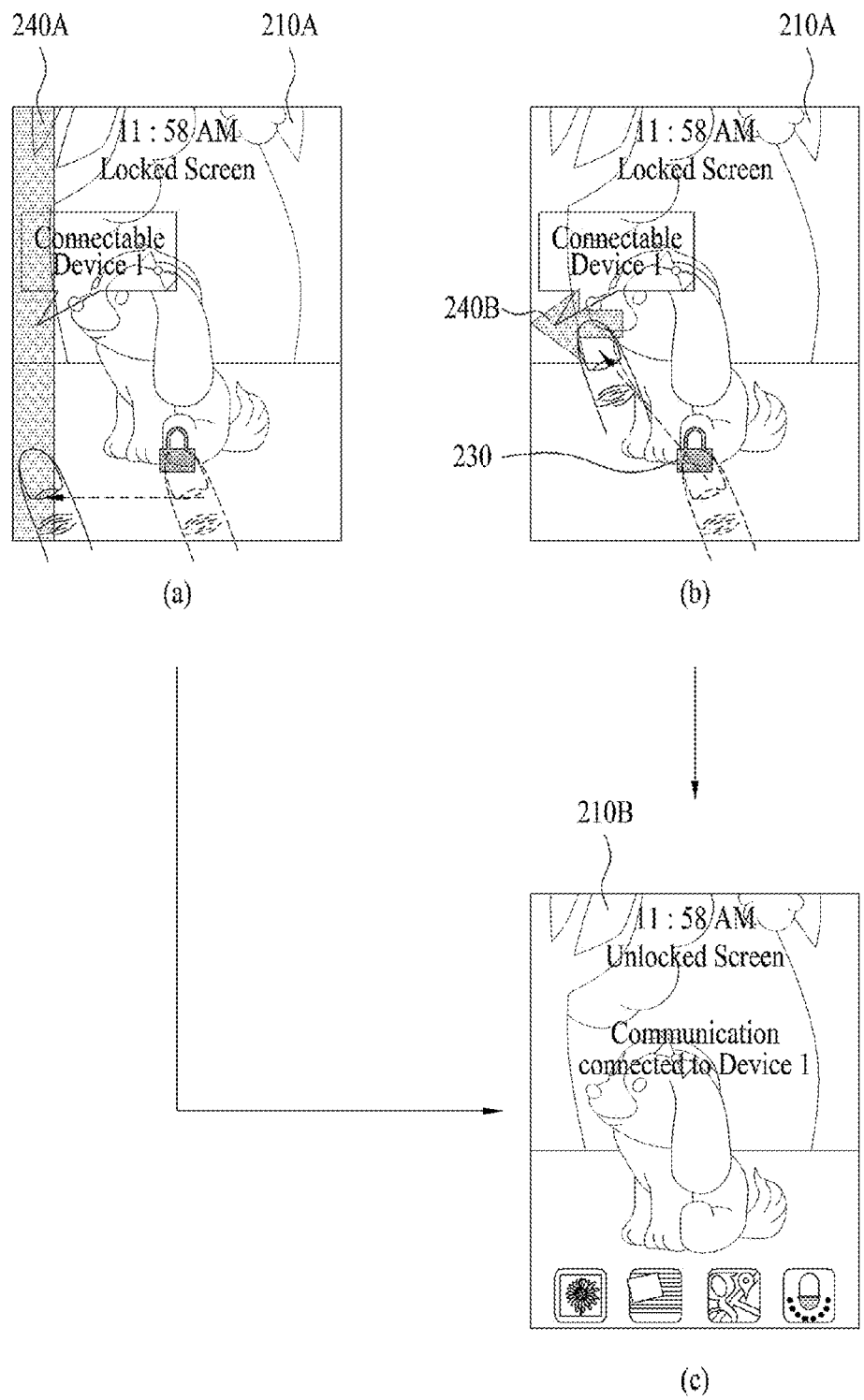

For instance, referring to FIG. 14 (a), while the locked screen 210A is displayed, if one communication-connectable external device is found by a search, the controller 180 configures the locked screen 210A into two locked screens and then places an item indicating the found external device not in the currently displayed locked screen 210A but in the other locked screen.

On the other hand, while the locked screen 210A is displayed, if two communication-connectable external devices are found by a search, the controller 180 configures the locked screen 210A into three locked screens and then places items indicating the found external devices not in the currently displayed locked screen 210A but in the rest of the locked screens, respectively.

Meanwhile, referring to FIG. 14 (a) and FIG. 14 (b), the controller 180 displays a guide information for guiding a location of the other locked screen, at which the item is located, on the currently displayed locked screen 210A.

For instance, referring to FIG. 14 (a), the guide information is displayed as a highlight 240A of a specific color on a lateral side of the current locked screen 210A. In particular, if a user performs a drag touch in direction, in which the highlight 240A is located, on the current locked screen 240A by looking at the location of the highlight 240A, referring to FIG. 14 (c), the controller 180 switches the current locked screen 210A to another locked screen, at which the item is located, unlocks the another locked screen into the unlocked screen 210B, and connects a communication with the external device corresponding to the item located within the unlocked screen.

On the other hand, referring to FIG. 14 (a), while the highlight 240A is displayed as the guide information, if the UI 230 in the current locked screen 240A is touched and the UI touched point is dragged into the highlight 240A, the controller 180 switches the current locked screen 210A to another locked screen, at which the item is located, unlocks the another locked screen into the unlocked screen 210B, and connects a communication with the external device corresponding to the item located within the unlocked screen.

Meanwhile, referring to FIG. 14 (a), the controller 180 displays a text information, which indicates the location of the another locked screen having the item located therein with reference to the current locked screen 240A, as the guide information. If the guide information is selected, the controller 180 switches the current locked screen 210A to another locked screen, at which the item is located, unlocks the another locked screen into the unlocked screen 210B, and connects a communication with the external device corresponding to the item located within the unlocked screen.

For another instance, referring to FIG. 14 (b), the guide information is displayed as an arrow shape 240B indicating a location of another locked screen, at which the item is located, within the current locked screen 210A. In particular, if a user is able to know the location of the another locked screen, at which the item is located, with reference to the current locked screen 240A by looking at the direction of the arrow 240B. if the user performs a drag touch in the direction of the arrow 240B, referring to FIG. 14 (c), the controller 180 switches the current locked screen 210A to another locked screen, at which the item is located, unlocks the another locked screen into the unlocked screen 210B, and connects a communication with the external device corresponding to the item located within the unlocked screen.

On the other hand, referring to FIG. 14 (b), while the arrow 240B is displayed as the guide information, if the UI 230 in the current locked screen 240A is touched and the UI touched point is dragged into the arrow 240B, the controller 180 switches the current locked screen 210A to another locked screen, at which the item is located, unlocks the another locked screen into the unlocked screen 210B, and connects a communication with the external device corresponding to the item located within the unlocked screen.

A following process is described in detail with reference to FIGS. 15 to 17. In particular, in the following process, while both screens of the mobile terminal 100 and at least one external device 700 are locked, the screens of the mobile terminal 100 and the external device 700 are simultaneously unlocked and the mobile terminal 100 connects a communication with the external device 700, in response to a user's touch gesture simultaneously inputted to both of the touchscreen 151 of the mobile terminal 100 and the touchscreen of the external terminal 700.

First of all, referring to FIG. 15, both a screen of a touchscreen of a mobile terminal 100 and a screen of a touchscreen of at least one external device 700 are locked. And, the mobile terminal 100 and the external device 700 are situated close to or in contact with each other. In doing so, in response to a user's pinching-in touch gesture simultaneously inputted to both of the locked screen of the mobile terminal and the locked screen of the external device 700, the locked screens of the mobile terminal 100 and the external device 700 are simultaneously unlocked and the mobile terminal 100 connects a communication with the external device 700.

Referring to FIG. 15 (*a*), after the controller 180 has found the external device 700 by a search via the wireless communication unit 110, the controller 180 detects that a 1$^{st}$ UI 230, which is displayed within the locked screen of the mobile terminal 100, for unlocking the locked screen of the mobile terminal 100 and a 2$^{nd}$ UI 810, which is displayed within the screen of the external device 700, for unlocking the locked screen of the external device 700 are touched. Subsequently, while both of the 1$^{st}$ UI 230 and the 2$^{nd}$ UI 810 are touched, a pinching-in touch gesture is inputted in a manner of decreasing a distance between the touched points of the 1$^{st}$ and 2$^{nd}$ UIs 230 and 810 into a range of a preset distance. If so, referring to FIG. 15 (*b*), the controller 180 controls both of the locked screens of the mobile terminal 100 and the external device 700 to be simultaneously unlocked and connects a communication with the external device 700.

In particular, if the 1$^{st}$ UI 230 is being touched via the touchscreen 151, the controller 180 transmits a signal, which queries whether the 2$^{nd}$ UI 810 of the external device 700 is in a touched state, to the external device 700 via the wireless communication unit 110. If a signal indicating that the 2$^{nd}$ UI is in the touched state is received from the external device 700 via the wireless communication unit 110, the controller 180 controls a guide information 240A, which informs a user of a touch gesture pattern for unlocking the locked screen of the touchscreen 151 in the mobile terminal 100, to be displayed on the touchscreen 151.

While the control unit 770 of the external device 700 detects that the 2$^{nd}$ UI 810 has been touched by the user via the display unit 760 of the touchscreen type, if the query signal is received from the mobile terminal 100 via the wireless communication unit 710, the control unit 770 of the external device 700 transmits a signal, which indicates that the 2$^{nd}$ UI 810 is in the touched state, to the mobile terminal 100 via the wireless communication unit 710.

And, the control unit 770 of the external device 700 controls a guide information 240A, which informs a user of a touch gesture pattern for unlocking the locked screen, to be displayed on the locked screen of the display unit 760.

Moreover, when the guide information 240A is displayed on the locked screen, if the signal indicating that the 2$^{nd}$ UI 810 is in the touched state is received from the external device 700, the controller 180 of the mobile terminal 100 can transmit a signal for commanding the external device 700 to display the guide information 240A to the external device 700 via the wireless communication unit 110.

For instance, referring to FIG. 15 (*b*), a 1$^{st}$ touch gesture 251A inputted to the 1$^{st}$ UI 230 of the mobile terminal 100 includes a touch gesture of a drag pattern performed toward a side in direction, in which the external device 700 is situated, from the 1$^{st}$ UI 230. And, a 2$^{nd}$ touch gesture 251B inputted to the 2$^{nd}$ UI 810 of the external device 700 includes a touch gesture of a drag pattern performed toward a side in direction, in which the mobile terminal 100 is situated, from the 2$^{nd}$ UI 810. Thus, a combination of the 1$^{st}$ and 2$^{nd}$ touch gestures 251A and 251B becomes a pinching-in touch gesture.

In particular, each of the mobile terminal 100 and the external device 700 displays the guide information 240A such as a highlight of a specific color on an almost contacting side in-between among sides of the corresponding screen. Therefore, the user can input the pinching-in touch gesture for unlocking the locked screens of the mobile terminal 100 and the external device 700 and connecting a communication between the mobile terminal 100 and the external device 700 to the 1$^{st}$ and 2$^{nd}$ UIs 230 and 810 of the mobile terminal 100 and the external device 700.

In doing so, if the 1$^{st}$ touch gesture 251A is inputted to the 1$^{st}$ UI 230, the controller 180 transmits a signal, which informs the external device 700 of a presence of the input of the 1$^{st}$ touch gesture 251A and queries whether the 2$^{nd}$ touch gesture 251B is inputted to the external device 700, to the external device 700 via the wireless communication unit 110.

When the external device 700 detects that the 2$^{nd}$ touch gesture 251B has been inputted to the 2$^{nd}$ UI 810 via the display unit 760, if the signal, which informs the external device 700 of a presence of the input of the 1$^{st}$ touch gesture 251A and queries whether the 2$^{nd}$ touch gesture 251B is inputted to the external device 700, is received from the mobile terminal 100, the external device 700 unlocks the locked screen of the display unit 760 and also transmits a signal, which indicates that the 2$^{nd}$ touch gesture 251B has been inputted, to the mobile terminal 100 via the wireless communication unit 710.

When the 1$^{st}$ touch gesture 251A has been inputted, if the signal indicating that the 2$^{nd}$ touch gesture 251B has been inputted is received from the external device 700, the controller 180 of the mobile terminal 100 unlocks the locked screen of the touchscreen 151 and also connects a communication with the external device 700 via the wireless communication unit 110.

On the other hand, referring to FIG. 15 (*b*), while the 1$^{st}$ touch gesture 251A has been inputted but is not released yet, if the signal indicating that the 2$^{nd}$ touch gesture 251B has been inputted is received from the external device 700, the controller 180 of the mobile terminal 100 reserves to unlock the locked screen of the touchscreen 151 and to connect the communication with the external device 700 until releasing the 1$^{st}$ touch gesture 251A and controls an indication information 260, which indicates that the locked screens of the mobile terminal 100 and the external device 700 can be simultaneously unlocked by the 1$^{st}$ and 2$^{nd}$ touch gestures 251A and 251B and that the communication can be connected between the mobile terminal 100 and the external device 700 by the 1$^{st}$ and 2$^{nd}$ touch gestures 251A and 251B, to be displayed on the locked screen of the touchscreen 151.

While the indication information 260 is displayed, if the 1$^{st}$ touch gesture 251A is released from the locked screen, the controller 180 stops displaying the indication information 260, transmits a signal, which indicates that the 1$^{st}$ touch gesture 251A has been released, via the wireless communication unit 110 in order for the external device 700 to unlock its locked screen, unlocks the locked screen of the touchscreen 151, and connects the communication with the external device 700.

If the signal indicating that the 1$^{st}$ touch gesture 251A was inputted and released is received from the mobile terminal 100, the external device 700 unlocks the locked screen of the display unit 760.

While the indication information 260 is displayed, if the 1$^{st}$ touch gesture 251A is released from the locked screen, the controller 180 transmits a signal, which indicates that the 1$^{st}$ touch gesture 251A was inputted and released and queries whether the 2$^{nd}$ touch gesture 251B was inputted and released, to the external device 700 via the wireless communication unit 110. If a signal indicating that the 2$^{nd}$ touch gesture 251B was inputted and released is received from the external device 700, the controller 180 stops displaying the indication information 260, unlocks the locked screen of the touchscreen 151, and connects a communication with the external device 700.

In particular, after the pinching-in touch gesture 251A and 251B for unlocking the locked screens of the mobile terminal 100 and the external device 700 and connecting the communication between the mobile terminal 100 and the external device 700 has been inputted to the $1^{st}$ UI 230 of the mobile terminal 10 and the $2^{nd}$ UI 810 of the external device 700, while the touch of the pinching-in touch gesture 251A and 251B is maintained, the controller 180 displays the indication information 260. If the user releases the pinching-in touch gesture 251A and 251B from the locked screens of the mobile terminal 100 and the external device 700, the controller 180 stops displaying the indication information 260, unlocks the locked screen of the touchscreen 151, and connects the communication with the external device 700.

FIG. 16 shows a following process. First of all, both a screen of a mobile terminal 100 and a screen of an external device 700 are locked. And, the mobile terminal 100 and the external device 700 are situated close to or in contact with each other. In doing so, in response to a user's drag touch gesture proceeding to the locked screen of the external device 700 via the locked screen of the mobile terminal 100, the locked screens of the mobile terminal 100 and the external device 700 are simultaneously unlocked and the mobile terminal 100 connects a communication with the external device 700.

Referring to FIG. 16 (a), after the controller 180 has found at least one external device 700 by a search via the wireless communication unit 110, as a $1^{st}$ UI 230, which is displayed within the locked screen of the mobile terminal 100, is touched, a $1^{st}$ touch gesture 252A of dragging the touched $1^{st}$ UI 230 to a specific point on a side almost contacting with the external device 700 among sides of the locked screen of the mobile terminal 100 is inputted. Subsequently, if a signal, which indicates that a $2^{nd}$ touch gesture 252B of touching a specific point of a side almost contacting with the mobile terminal 100 and then dragging the specific point to a $2^{nd}$ UI 810 of the external device 700 has been inputted, is received from the external device 700, the controller 180 controls both of the locked screens of the mobile terminal 100 and the external device 700 to be simultaneously unlocked and connects a communication with the external device 700.

In particular, if the $1^{st}$ touch gesture 252A is inputted to the locked screen of the touchscreen 151, the controller 180 transmits a signal, which indicates that the $1^{st}$ touch gesture 252A has been inputted and queries whether the $2^{nd}$ touch gesture 252B has been inputted, to the external device 700 via the wireless communication unit 110.

After the $2^{nd}$ touch gesture 252B has been inputted to the locked screen of the display unit 760 of the touchscreen type, if the signal, which indicates that the $1^{st}$ touch gesture 252A has been inputted and queries whether the $2^{nd}$ touch gesture 252B has been inputted, is received from the mobile terminal 100, the control unit 770 of the external device 700 unlocks the locked screen of the display unit 760 and also transmits a signal, which indicates that the $2^{nd}$ touch gesture 252B has been inputted, to the mobile terminal 100 via the wireless communication unit 710.

If the signal indicating that the $2^{nd}$ touch gesture 252B has been inputted is received from the external device 700, the controller 180 of the mobile terminal 100 unlocks the locked screen of the touchscreen 151 and also connects a communication with the external device 700 via the wireless communication unit.

In particular, the user connects the UIs 230 and 810, which are displayed within the screens of at least two devices 100 and 700, for unlocking the locked screens to each other by sequentially dragging & touching the UIs 230 and 810, thereby unlocking the locked screens of the at least two devices 100 and 700 and also connecting a communication between the at least two devices 100 and 700.

On the other hand, referring to FIG. 16 (b), after the $1^{st}$ touch gesture 252A has been inputted, if the signal indicating that the $2^{nd}$ touch gesture 251B inputted to the external device 700 is not released yet is received from the external device 700, the controller 180 of the mobile terminal 100 reserves to unlock the locked screen of the touchscreen 151 and to connect the communication with the external device 700 until receiving a signal indicating that the 2nd touch gesture 252B has been released and controls an indication information 260, which indicates that the locked screens of the mobile terminal 100 and the external device 700 can be simultaneously unlocked by the $1^{st}$ and $2^{nd}$ touch gestures 252A and 252B and that the communication can be connected between the mobile terminal 100 and the external device 700 by the $1^{st}$ and $2^{nd}$ touch gestures 251A and 251B, to be displayed on the locked screen of the touchscreen 151.

While the indication information 260 is displayed, if the signal indicating that the inputted 2nd touch gesture 252B has been released is received from the external device 700, the controller 180 stops displaying the indication information 260, unlocks the locked screen of the touchscreen 151, and connects the communication with the external device 700.

In particular, after the user has inputted the touch gesture 252A and 252B dragged to the 2nd UI 810 of the external device 700 via the 1st UI 230, while the touch to the 2nd UI 810 is maintained, the controller 180 displays the indication information 260. If the user releases the touch to the 2nd UI 810, the controller 180 stops displaying the indication information 260, unlocks the locked screen of the touchscreen 151, and connects the communication with the external device 700.

Figure 17:
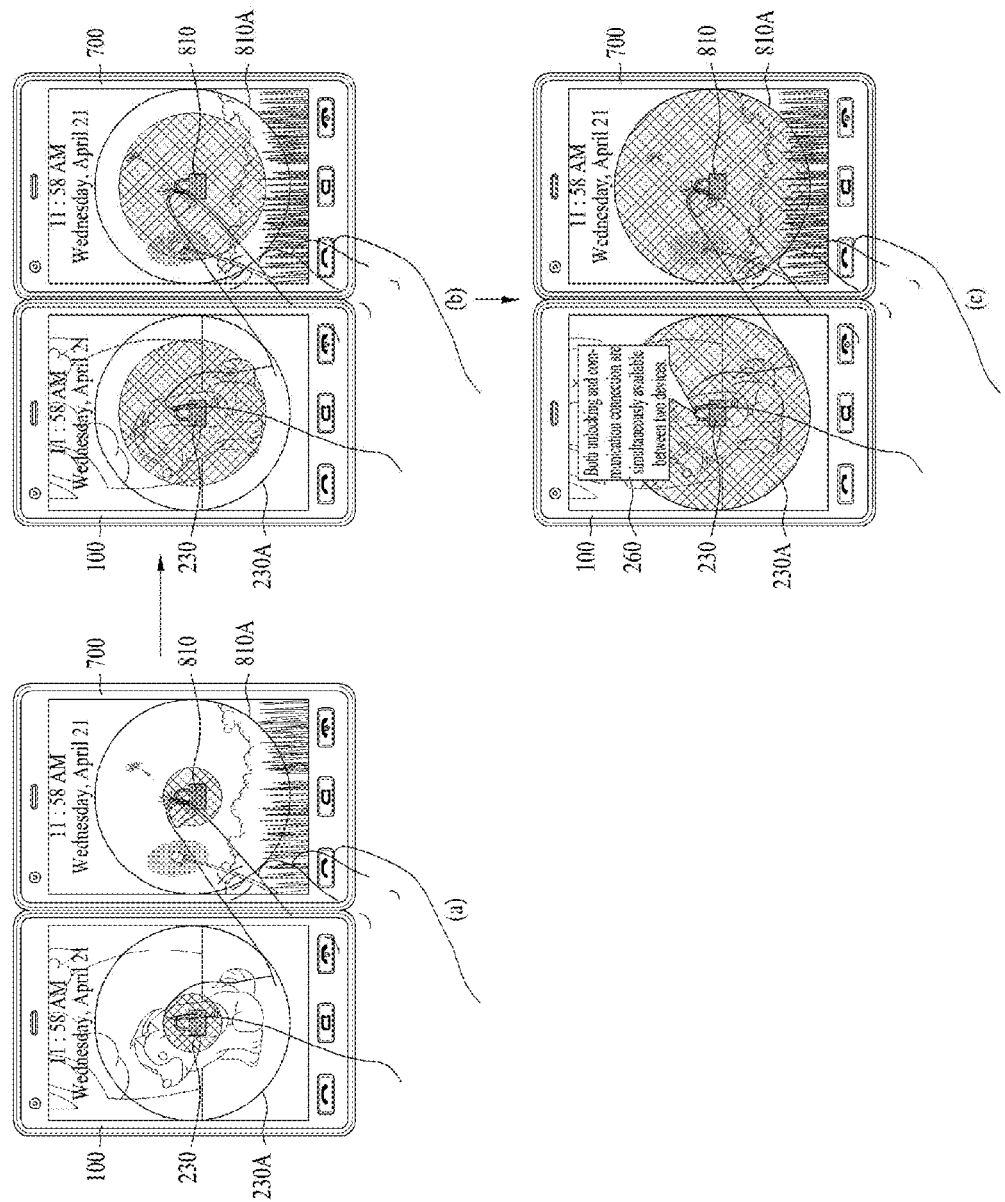

FIG. 17 shows a following process. First of all, both a screen of a mobile terminal 100 and a screen of at least one communication-connectable external device 700 are locked. And, the mobile terminal 100 and the external device 700 are situated close to or in contact with each other. In doing so, in response to user's long touch gestures simultaneously inputted to both of the locked screen of the external device 700 and the locked screen of the mobile terminal 100, the locked screens of the mobile terminal 100 and the external device 700 are simultaneously unlocked and the mobile terminal 100 connects a communication with the external device 700.

Referring to FIG. 17 (a), when the $1^{st}$ UI 230 and the $2^{nd}$ UI are displayed within the locked screen of the mobile terminal and the locked screen of the external device 700, respectively, if both of the $1^{st}$ UI 230 and the $2^{nd}$ UI 810 are simultaneously long touched, a $1^{st}$ concentric circle 230A for guiding a long touch time for unlocking the locked screen of the mobile terminal 100 and connecting a communication between the mobile terminal 100 and the external device 700 and a $2^{nd}$ concentric circle 810A for guiding a long touch time for unlocking the locked screen of the external device 700 and connecting the communication between the mobile terminal 100 and the external device 700 are displayed outside the $1^{st}$ UI 230 and the $2^{nd}$ UI 810, respectively.

In this case, shape sizes of the $1^{st}$ UI 230 and the $2^{nd}$ UI 810 are normally smaller than those of the $1^{st}$ concentric circle 230A and the $2^{nd}$ concentric circle 810A and gradually change to get equal to those of the 1$^{st}$ concentric circle 230A and the 2$^{nd}$ concentric circle 810A in proportion to the user's long touch times, respectively.

Referring to FIG. 17 (b) and FIG. 17 (c), when the 1$^{st}$ UI 230 is being touched, as a touch maintained time of the 1$^{st}$ UI 230 increases, the controller 180 enlarges the shape size of the 1$^{st}$ UI 230 to get closer to the size of the 1$^{st}$ concentric circle 230A and transmits a signal, which queries whether a touch maintained time of the 2$^{nd}$ UI 810 meets a time for unlocking the locked screen of the external device 700, to the external device 700 via the wireless communication unit 110.

When the 2$^{nd}$ UI 810 is being touched, as the touch maintained time of the 2$^{nd}$ UI 810 increases, the control unit 770 of the external device 700 enlarges the shape size of the 2$^{nd}$ UI 810 to get closer to the size of the 2$^{nd}$ concentric circle 810A.

As the touch maintained time of the 2$^{nd}$ UI 810 elapses, when the shape size of the 2$^{nd}$ UI 810 gets equal to the size of the 2$^{nd}$ concentric circle 810A, if the query signal is received from the mobile terminal 100 via the wireless communication unit, the control unit 770 of the external device 700 unlocks the locked screen of the display unit 760 and also transmits a signal, which indicates that the touch maintained time of the 2$^{nd}$ UI 810 meets the time for unlocking the locked screen of the external device 700, to the mobile terminal 100.

When the shape size of the 1$^{st}$ UI 230 becomes equal to the size of the 1$^{st}$ concentric circle 230A, if the signal indicating that the touch maintained time of the 2$^{nd}$ UI 810 meets the time for unlocking the locked screen of the external device 700 is received from the external unit 700 via the wireless communication unit 110, since the long touched time of the 1$^{st}$ UI 230 and the long touched time of the 2$^{nd}$ UI 810 meet the condition for unlocking the locked screens of the mobile terminal 100 and the external device 700 and connecting the communication in-between, the controller 180 of the mobile terminal 100 unlocks the locked screen of the touchscreen 151 and also connects a communication with the external device 700 via the wireless communication unit.

In particular, the user touches the UIs 230 and 810 for unlocking the locked screens displayed within the screens of the at least two devices 100 and 700 for prescribed duration at least, thereby unlocking the locked screens of the at least two devices 100 and 700 and also connecting a communication between the at least two devices 100 and 700.

Moreover, referring to FIG. 17 (c), when the shape size of the 1$^{st}$ UI 230 is equal to that of the 1$^{st}$ concentric circle 230A and the long touch to the 1$^{st}$ UI 230 is not released yet, if the signal indicating that the long touch to the 2$^{nd}$ UI 810 is not released is received from the external device 700, the controller 180 of the mobile terminal 100 reserves to unlock the locked screen of the touchscreen 151 and to connect the communication with the external device 700 until releasing the long touch to the 1$^{st}$ UI 230 or receiving a signal indicating that the long touch to the 2$^{nd}$ UI 810 has been released and controls an indication information 260, which indicates that the locked screens of the mobile terminal 100 and the external device 700 can be simultaneously unlocked by the long touches to the 1$^{st}$ and 2$^{nd}$ UIs 230 and 810 and that the communication can be connected between the mobile terminal 100 and the external device 700 by the long touches to the 1$^{st}$ and 2$^{nd}$ UIs 230 and 810, to be displayed on the locked screen of the touchscreen 151.

While the indication information 260 is displayed, if the long touch to the 1$^{st}$ UI 230 is released or the signal indicating that the long touch to the 2$^{nd}$ UI 810 has been released is received from the external device 700, the controller 180 stops displaying the indication information 260, unlocks the locked screen of the touchscreen 151, and connects the communication with the external device 700.

In particular, while the user maintains the long touches to the 1$^{st}$ and 2$^{nd}$ UIs 230 and 810, the controller 180 displays the indication information 260. If the user releases the touch to the 1$^{st}$ UI 230, the touch to the 2$^{nd}$ UI 810 or both of the touches, the controller 180 stops displaying the indication information 260, unlocks the locked screen of the touchscreen 151, and connects the communication with the external device 700.

So far, the steps S140 and S160 are described in detail with reference to FIGS. 5 to 17.

In the following description, while the locked screens are unlocked and the communication with the external 700 is connected by the steps S110 to S160 shown in FIG. 5, a process for enabling a function to interwork between the mobile terminal 100 and the external device 700, which is one embodiment of a process for controlling the operation of the external device 700 in the step S170, is explained in detail with reference to FIGS. 18 to 25.

In particular, referring to FIGS. 18 to 25, while the locked screen is unlocked and the connection with the external device 700 is connected by the processes shown in FIGS. 5 to 17, the controller 180 controls at least one function item, which is interworkable with the communication-connected external device 700 among functions provided to the mobile terminal 100, to be displayed on the unlocked screen. If the function item is selected, the controller 180 can control the function corresponding to the selected function item to interwork with the external device 700. In this case, the interworkable function can include such a function interworkable with the external device 700 in the mobile terminal 100 as an application providing a specific function, a widget, a content, a menu function and the like.

Figure 18:
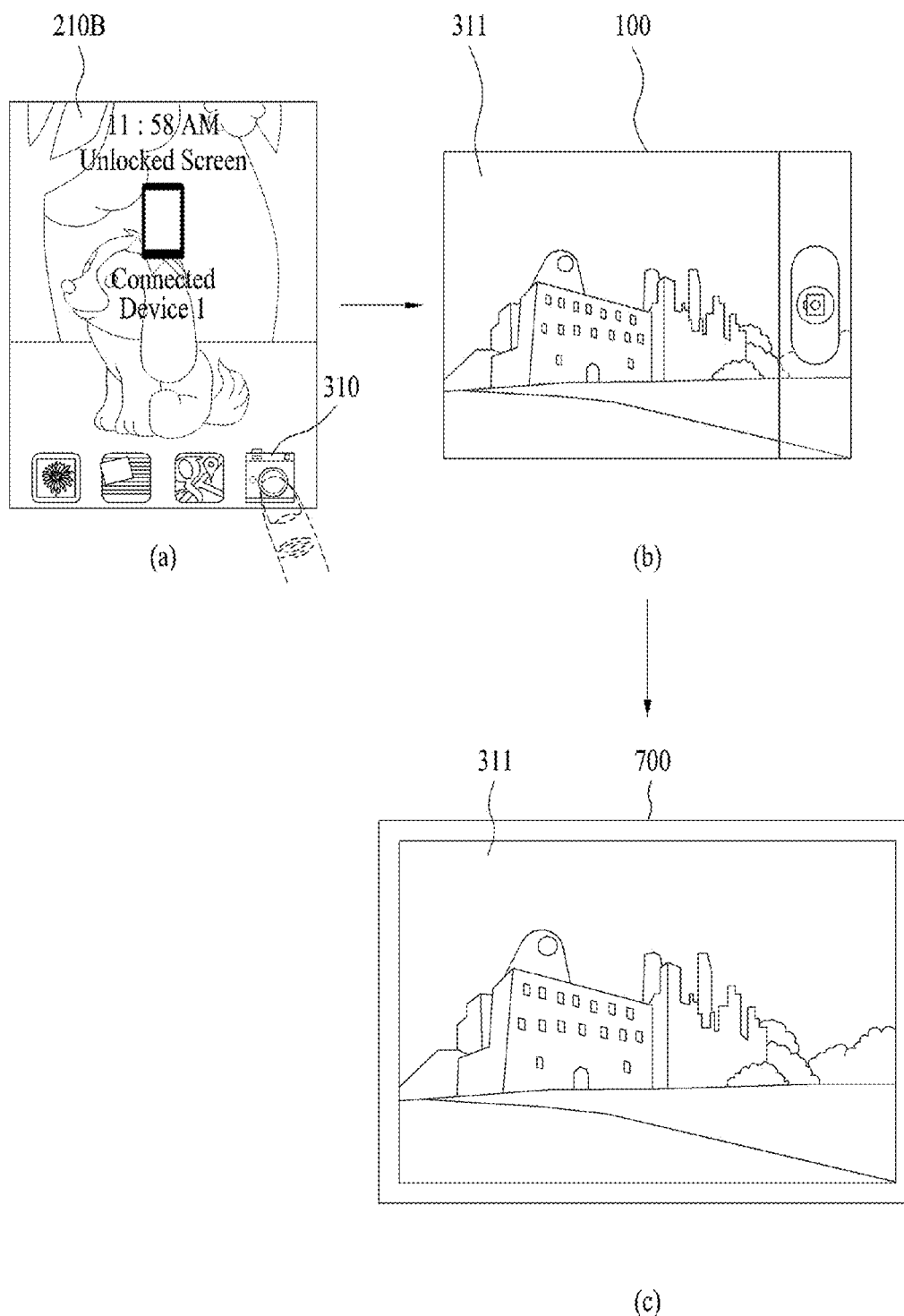

For instance, referring to FIG. 18, while the mobile terminal 100 connects the communication with the external device 700, the function interworkable with the external device 700 includes a camera function of the mobile terminal 100.

In particular, referring to FIG. 18 (a), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If a camera function item 310 is selected from the displayed function items, the controller 180 activates the camera 121, displays a preview image inputted from the camera [FIG. 18 (b)], and transmits the preview image 311 to the external device 700 via the wireless communication unit 110 in order for the preview image 311 to be displayed on the communication-connected external device 700.

In doing so, the controller 180 may transmit the preview image 311 inputted from the camera 121 to the external device 700 via the wireless communication unit 110 by real-time streaming or by capturing the preview image 311 inputted from the camera 121.

In particular, a user can view the preview image 311 inputted from the camera 121 of the mobile terminal 100 via the external device 700 having a large-scale screen.

Figure 19:
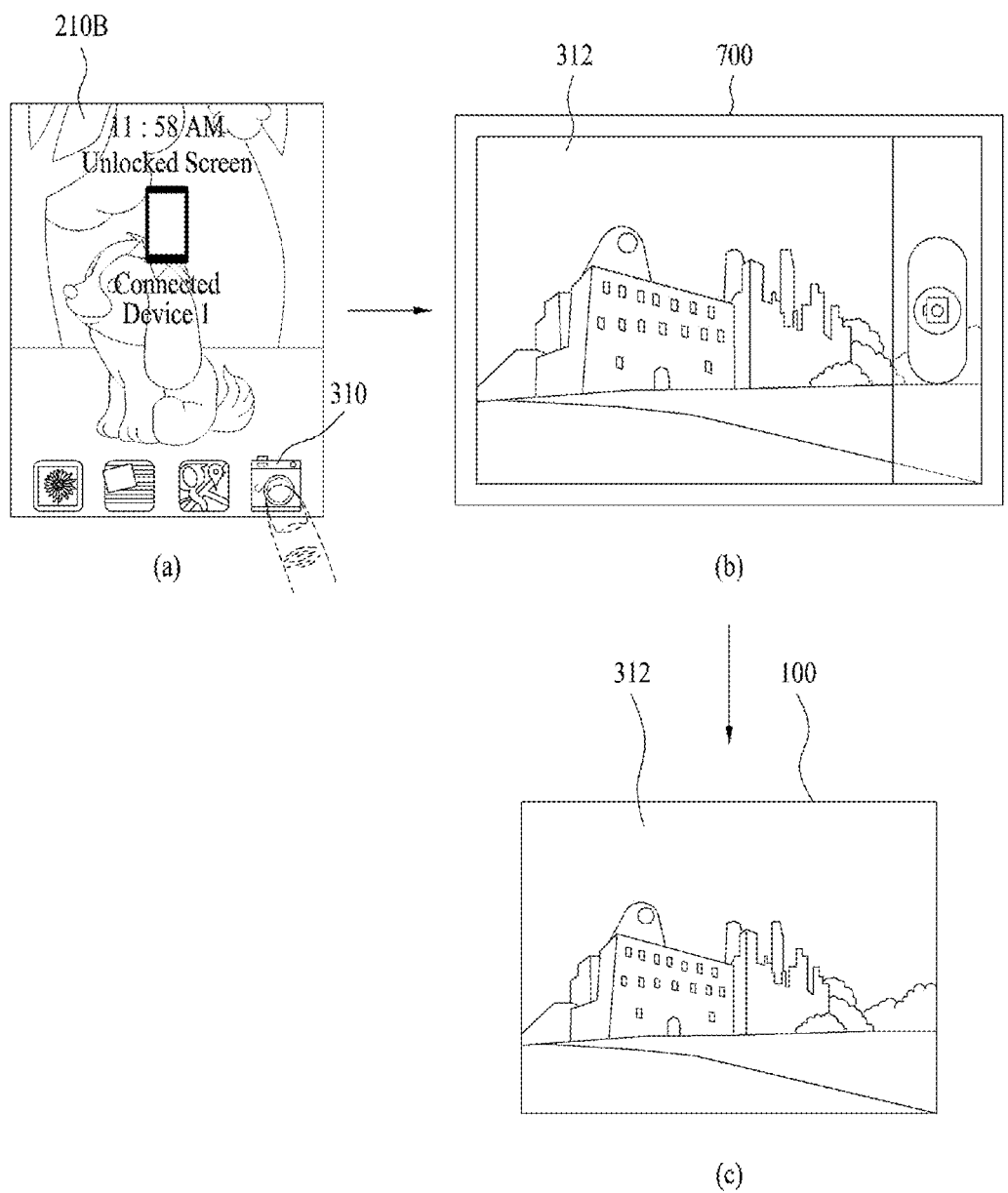

Referring to FIG. 19, while the mobile terminal 100 connects the communication with the external device 700, the function interworkable with the external device 700 includes a camera function of the external device 700.

In particular, referring to FIG. 19 (*a*), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If a camera function item 310 is selected from the displayed function items, unlike the process shown in FIG. 15, the controller 180 transmits a signal for requesting a transmission of a preview image 312 of the camera 720 of the external device 700 to the external device 700 via the wireless communication unit 110 instead of activating the camera 121 of the mobile terminal 100.

If so, referring to FIG. 19 (*b*), the control unit 770 of the external device 700 activates the camera 720 of the external device 700, displays a preview image 312 inputted from the camera 720 of the external device 700 on the display unit 760 of the external device 700, and transmits the preview image 312 to the mobile terminal 100 via the wireless communication unit 710 of the external device 700 in response to the request made by the mobile terminal 100 in order for the preview image 312 to be displayed on the unlocked screen 210B of the touchscreen 151 of the mobile terminal 100.

In doing so, the control unit 770 may transmit the preview image 312 inputted from the camera 720 to the mobile terminal 100 via the wireless communication unit 710 by real-time streaming or by capturing the preview image 312 inputted from the camera 720.

If so, referring to FIG. 19 (*c*), the controller 180 of the mobile terminal 100 displays the preview image 312 received from the external device 700 via the wireless communication unit 110 on the unlocked screen of the touchscreen 151.

Figure 20:
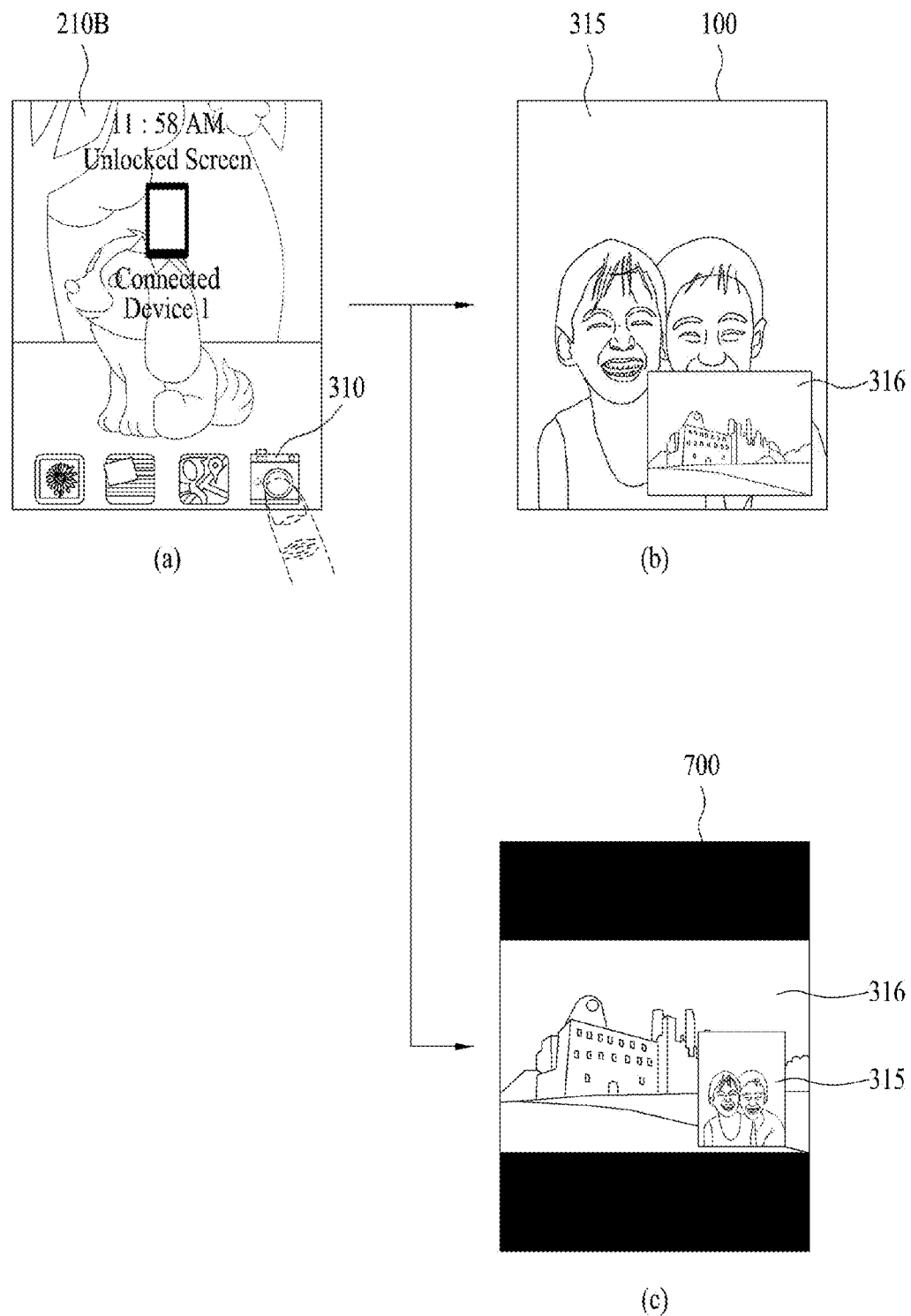

Referring to FIG. 20, while the mobile terminal 100 connects the communication with the external device 700, the function interworkable with the external device 700 includes a camera function of the mobile terminal 100 and a camera function of the external device 700.

In particular, referring to FIG. 20 (*a*), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If a camera function item 310 is selected from the displayed function items, the controller 180 activates the camera 121 of the mobile terminal 100 and transmits a preview image 315 inputted from the camera 121 and a signal for requesting a transmission of a preview image 316 of the camera 720 of the external device 700 to the external device 700 via the wireless communication unit 110.

If so, the control unit 770 of the external device 700 activates the camera 720 of the external device 700, displays the preview image 316 inputted from the camera 720 of the external device 700 and the preview image 315 received from the mobile terminal 100 on the display unit 760 of the external device 700, and transmits the preview image 316 to the mobile terminal 100 via the wireless communication unit 710 of the external device 700 in response to the request made by the mobile terminal 100 in order for the preview image 316 to be displayed on the screen of the mobile terminal 100 together with the preview image 315 of the mobile terminal 100.

Referring to FIG. 20 (*b*), if the preview image 316 is received from the external device 700, the controller 180 controls both of the preview image 315 inputted from the camera 121 and the received preview image 316 to be displayed on the screen.

In doing so, referring to FIG. 20 (*b*), the controller 180 displays the preview image 315 of the mobile terminal 100 on a full screen and also displays the preview image 316 received from the external device 700 in a small size within the preview image 315 of the mobile terminal 100. Alternatively, the controller 180 displays the preview image 316 received from the external device 700 on a full screen and displays the preview image 315 of the mobile terminal 100 in a small size within the preview image 316 received from the external device 700.

Moreover, referring to FIG. 20 (*c*), the control unit 770 of the external device 700 displays the preview image 316 of the external device 700 as a main screen on a full screen and also displays the preview image 315 received from the mobile terminal 100 in a small size within the preview image 316 of the external device. Alternatively, the control unit 770 of the external device 700 displays the preview image 315 received from the mobile terminal 100 as a main screen on a full screen and also displays the preview image 316 of the external device 700 in a small size within the preview image 315 received from the mobile terminal 100.

Meanwhile, while the preview image 315 of the mobile terminal 100 and the preview image 316 of the external device 700 are displayed on the screen together, if a capture command is inputted by a user, the controller 180 of the mobile terminal 100 captures an image resulting from merging the preview image 315 of the mobile terminal 100 and the preview image 316 of the external device 700 into one image, saves the captured image in the memory 160, and can transmit a signal for commanding the external device 700 to capture to the external device 700 via the wireless communication unit 110 as well.

In doing so, if the capture command signal is received from the mobile terminal 100, the control unit 770 of the external device 700 captures an image resulting from merging the preview image 316 of the external device 700 displayed on the screen and the preview image 315 of the mobile terminal 100 into one image and is then able to save the captured image in the memory 740.

On the contrary, while the preview image 315 of the mobile terminal 100 and the preview image 316 of the external device 700 are displayed on the screen together, if a capture command is inputted by a user, the control unit 770 of the external device 700 captures an image resulting from merging the preview image 315 of the mobile terminal 100 and the preview image 316 of the external device 700 into one image, saves the captured image in the memory 740, and can transmit a signal for commanding the mobile terminal 100 to capture to the mobile terminal 100 via the wireless communication unit 710 as well.

In doing so, if the capture command signal is received from the external device 700, the controller 180 of the mobile terminal 100 captures an image resulting from merging the preview image 316 of the external device 700 displayed on the screen and the preview image 315 of the mobile terminal 100 into one image and is then able to save the captured image in the memory 160.

Figure 21:
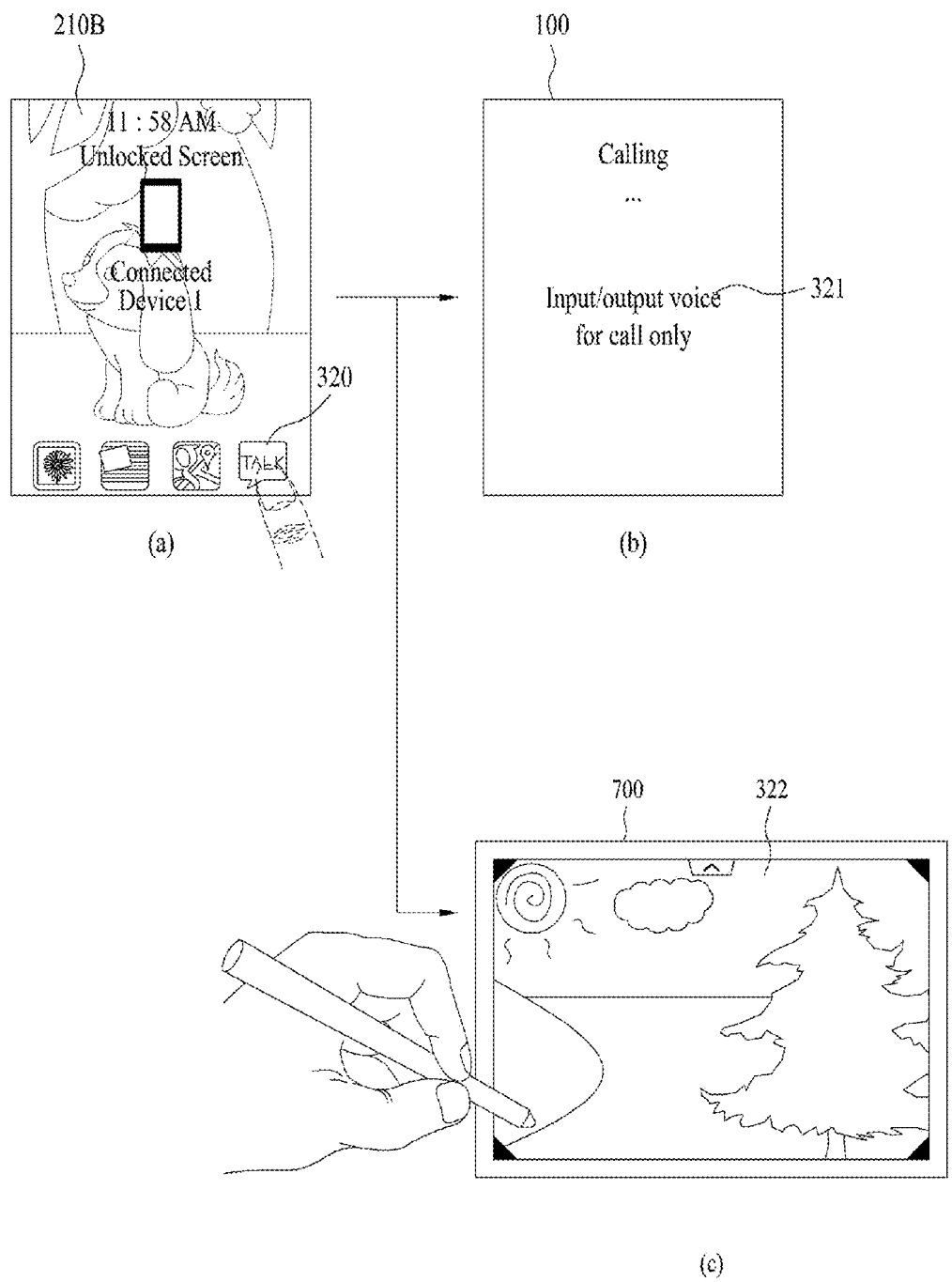

Referring to FIG. 21, while the mobile terminal 100 connects the communication with the external device 700, the function interworkable with the external device 700 includes a memo sending function of sending a memo to a counterpart in the course of making a call to the counterpart.

In this case, the memo sensing function includes the function of sending a memo content, which is currently inputted to the screen of the mobile terminal 100, to a terminal of a specific counterpart in order for the memo content to be identically displayed on a screen of the terminal of the specific counterpart in the course of making a call to the specific counterpart.

In particular, referring to FIG. 21 (*a*), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If the function item 320 providing a memo function in the course of making a call to a specific counterpart is selected from the displayed function items, the controller 180 connects a call to a terminal of the specific counterpart via the wireless communication unit 110. In doing so, if the function item 320 is selected, the controller 180 displays a previously provided contact list. If a contact of the specific counterpart is selected from the contact list, the controller 180 can connect the call to the terminal of the selected specific counterpart.

Subsequently, referring to FIG. 21 (*b*), if the call to the terminal of the specific counterpart is connected via the wireless communication unit 110, the controller 180 controls a call speech 321 transceived via the wireless communication unit 110 to be inputted/outputted to/from the mobile terminal 100 only.

Referring to FIG. 21 (*c*), the controller 180 transmits a signal, which commands the external device 700 to operate in a memo writing mode, to the external device 700 via the wireless communication unit 110. If a written memo content 322 is received from the external device 700, the controller 180 transmits the received memo content to the terminal of the specific counterpart in the course of making the call via the wireless communication unit 110.

In particular, a user can write a memo content to send to the specific counterpart via the external device 700 having a large-scale screen while making a voice call to the specific counterpart via the mobile terminal 100.

Figure 22:
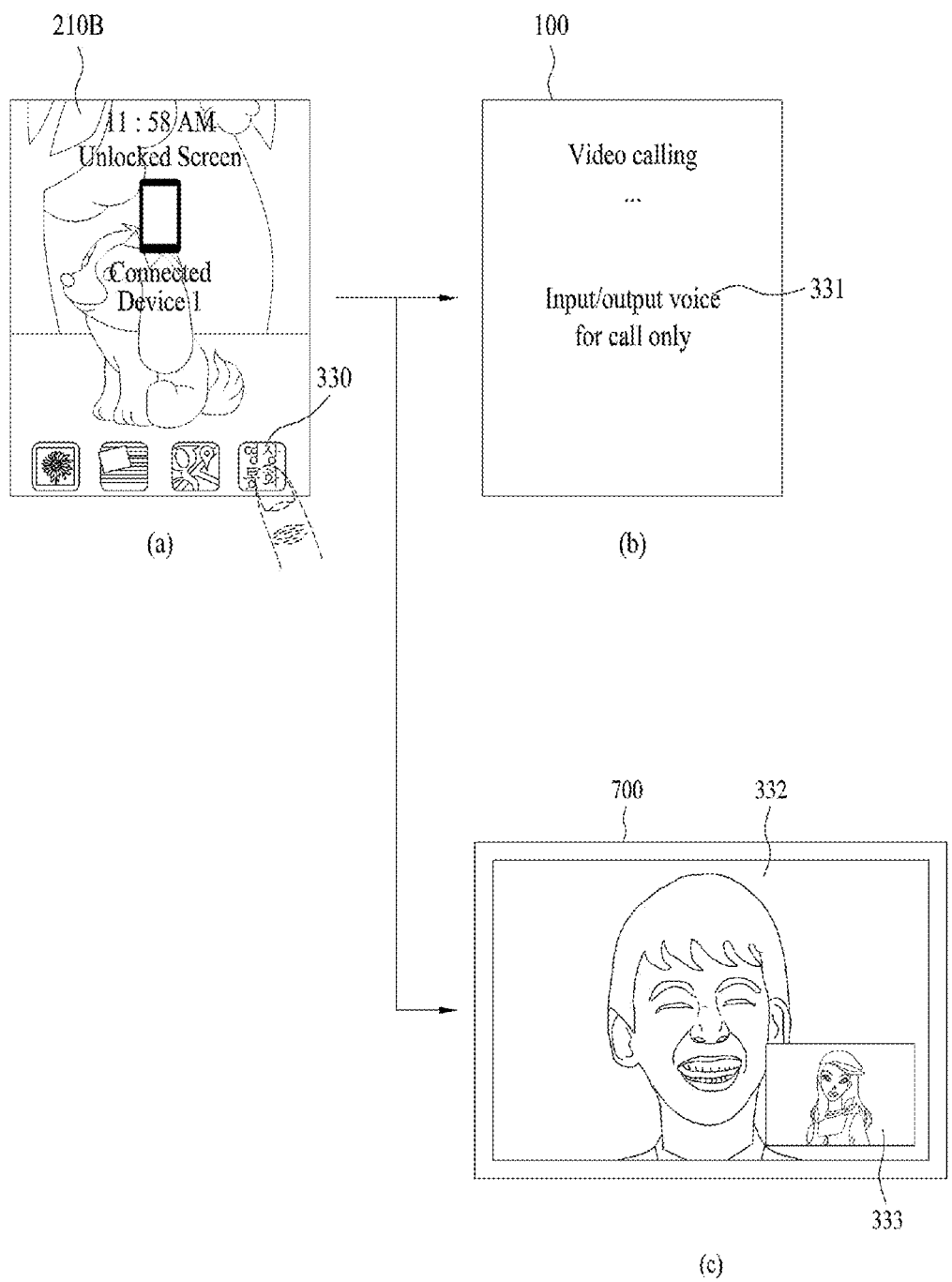

Referring to FIG. 22, while the mobile terminal 100 connects the communication with the external device 700, the function interworkable with the external device 700 includes a video call function of making a video call to at least one counterpart.

In particular, referring to FIG. 22 (*a*), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If the function item 330 providing a video call function of a video call to a specific counterpart is selected from the displayed function items, the controller 180 connects a video call to a terminal of the specific counterpart via the wireless communication unit 110. In doing so, if the function item 330 is selected, the controller 180 displays a previously provided contact list. If a contact of the specific counterpart is selected from the contact list, the controller 180 can connect the video call to the terminal of the selected specific counterpart.

Subsequently, referring to FIG. 22 (*b*), if the video call to the terminal of the specific counterpart is connected via the wireless communication unit 110, the controller 180 controls a call speech 321 transceived via the wireless communication unit 110 to be inputted/outputted to/from the mobile terminal 100 only.

And, in order for a counterpart image 332 received by real time via the wireless communication unit 110 to be displayed on the external device 700 by real time, the controller 180 transmits the real-time received counterpart image 332 to the external device 700 by real time via the wireless communication unit 110.

Moreover, referring to FIG. 22 (*c*), the controller 180 transmits a signal, which makes requests for an activation of the camera 720 and a transmission of a user-contained preview image 333 inputted from the camera 720 to the external device 700, to the external device 700 via the wireless communication unit 110.

If so, in response to the request signal, the external device activates the camera 720, displays the preview image 333 inputted from the camera 720 together with the counterpart image 332, and transmits the preview image 333 to the mobile terminal 100.

Subsequently, if the user-contained preview image 333 is received from the external device 700, the controller 180 can transmit the received preview image 333 as a user image for the video call to the terminal of the counterpart.

In particular, in the course of the video call, the user can view the image 332 of the specific counterpart and the user image 333 via the external device 700 having the large-scale screen while making a voice call to the specific counterpart via the mobile terminal 100.

Figure 23:
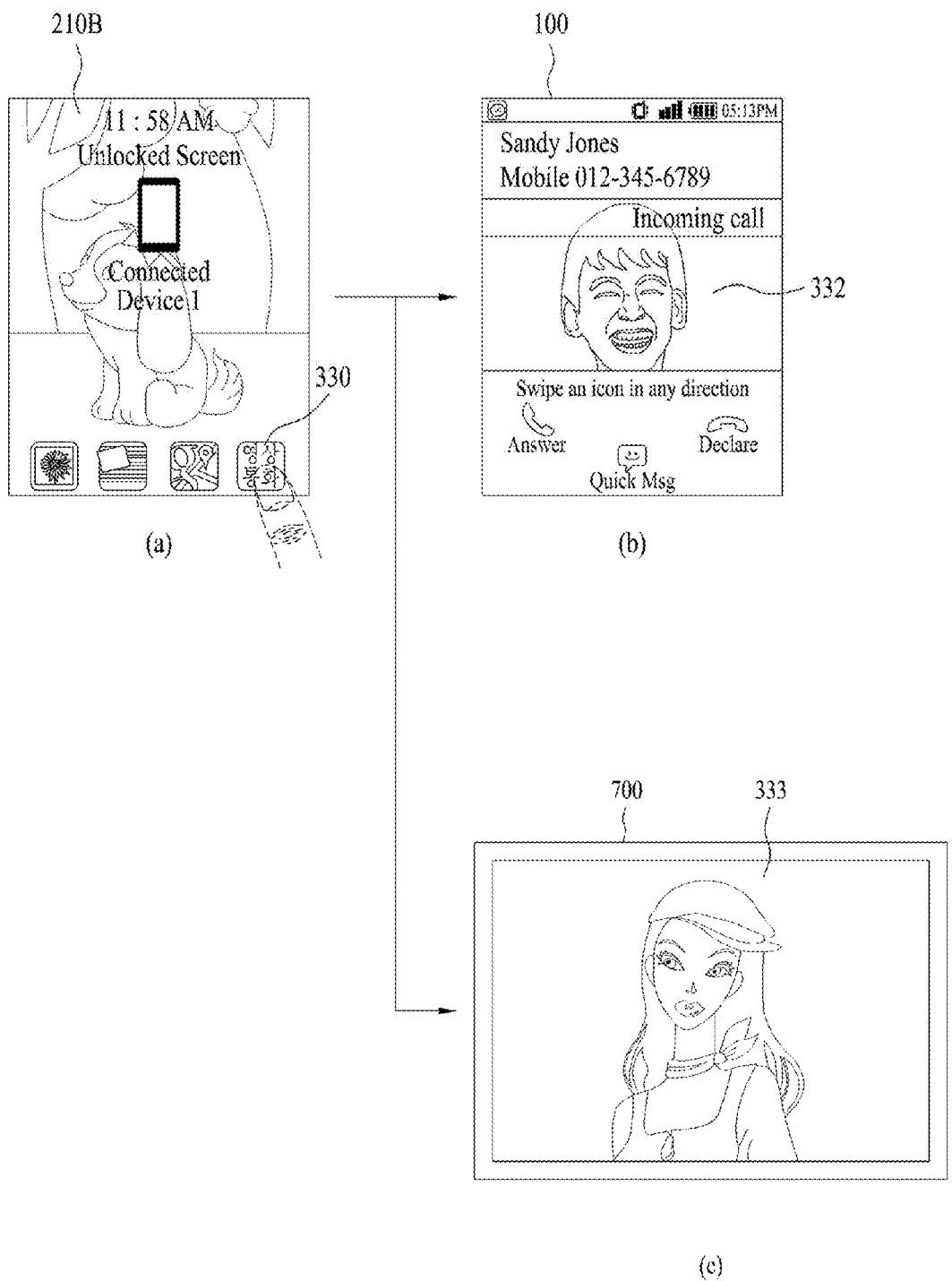

On the other hand, referring to FIG. 23 (*a*) and FIG. 23 (*b*), unlike the process shown in FIG. 22, if the video call to the counterpart is connected, the controller 180 displays the counterpart image 332 received via the wireless communication unit 110 on the screen of the mobile terminal 100.

Subsequently, referring to FIG. 23 (*c*), the controller 180 transmits a signal, which makes requests for an activation of the camera 720 and a transmission of a user-contained preview image 333 inputted from the camera 720 to the external device 700, to the external device 700 via the wireless communication unit 110.

If so, in response to the request signal, the external device activates the camera 720, displays the preview image 333 inputted from the camera 720 together with the counterpart image 332, and transmits the preview image 333 to the mobile terminal 100.

Subsequently, if the user-contained preview image 333 is received from the external device 700, the controller 180 can transmit the received preview image 333 as a user image for the video call to the terminal of the counterpart.

Figure 24:
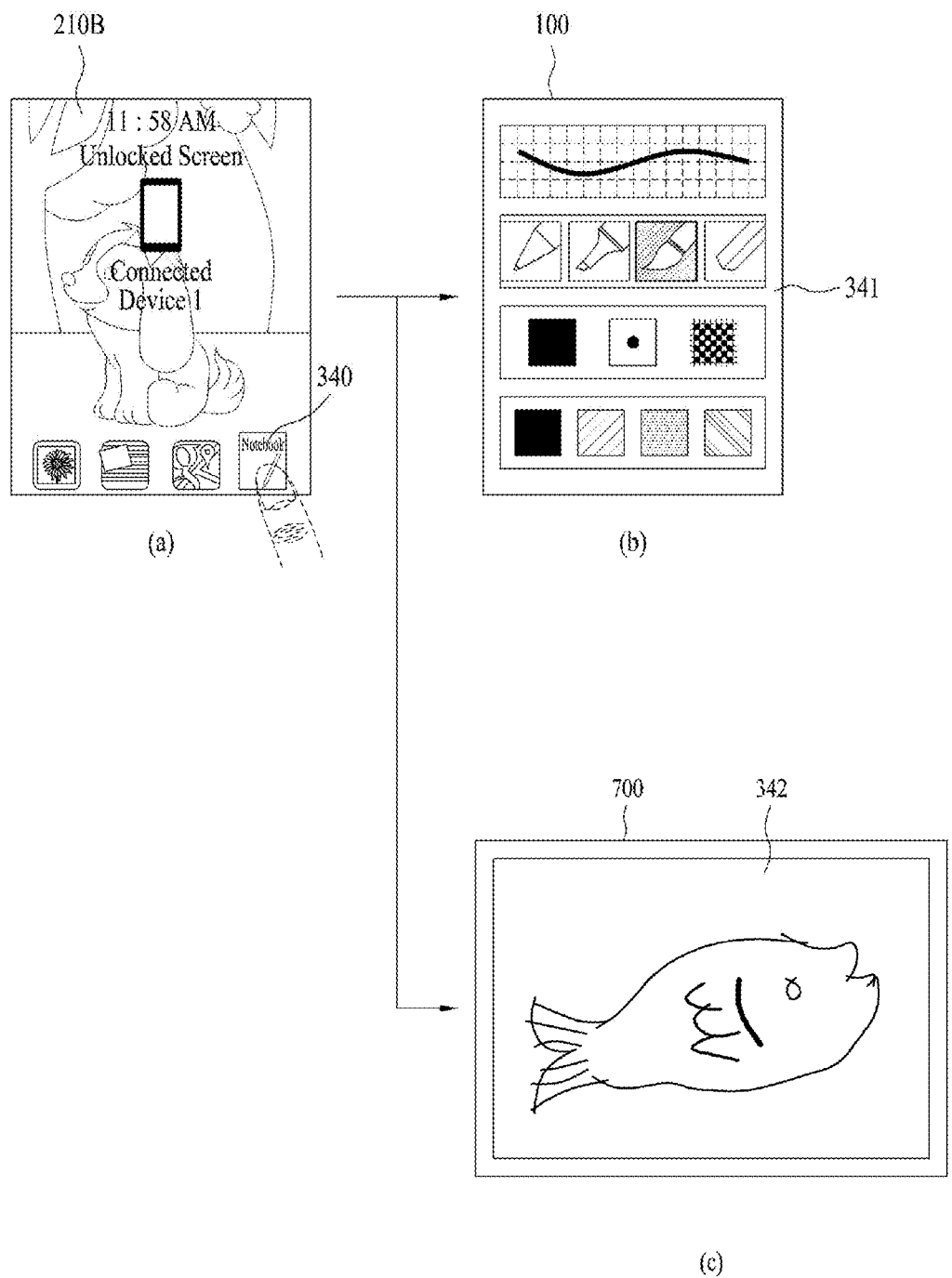

Referring to FIG. 24, while the mobile terminal 100 connects the communication with the external device 700, the function interworkable with the external device 700 includes a pallet function. In this case, the pallet function means the function of enabling all shapes (e.g., figures, characters, drawings, etc.) to be drawn via the touchscreen 151 of the mobile terminal 100. In particular, the pallet function can be included in at least one of a memo function, an email function, a messenger function, a message function, a document function, a schedule function, an image editing function and the like.

Referring to FIG. 24 (a), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If the function item 340 providing a pallet function is selected from the displayed function items, the controller 180 activates the pallet function, displays a pallet UI (user interface) 341 for picture drawing in an active screen of the pallet function on the screen of the mobile terminal 100 only [FIG. 24 (b)], and transmits a picture display window 342 for displaying a picture drawn via the pallet UI 341 to the external device 700 via the wireless communication unit 110 in order for the picture display window 342 to be displayed on the external device 700 [FIG. 24 (c)].

Thereafter, if a drawing signal for the picture drawing is inputted via the pallet UI 341, the controller 180 transmits the inputted drawing signal to the external device 700 in order for the external device 700 to display the corresponding drawn picture on the picture display window 342 to correspond to the drawing signal.

Figure 25:
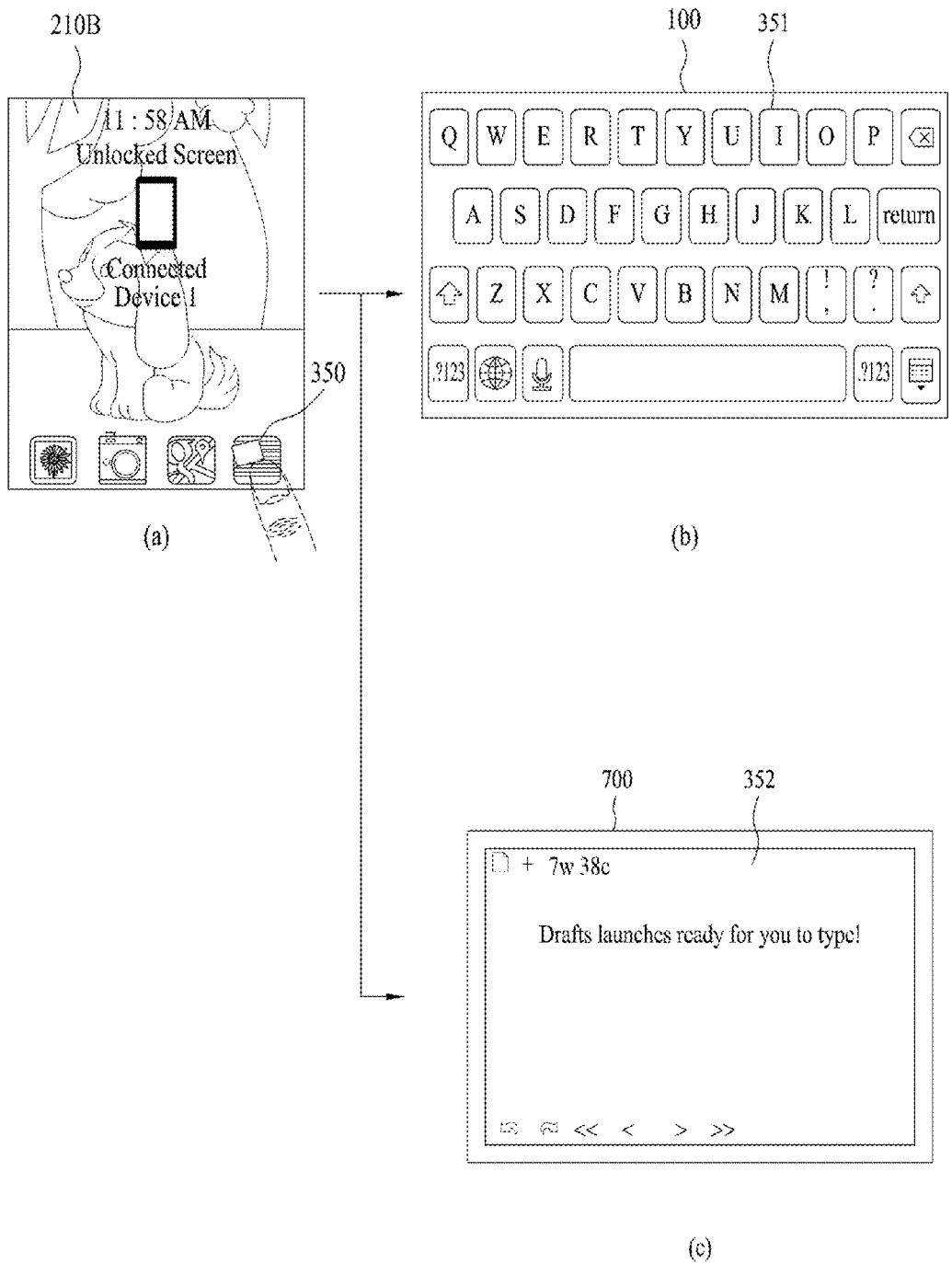

Referring to FIG. 25, while the mobile terminal 100 connects the communication with the external device 700, the function interworkable with the external device 700 includes a text writing function.

In this case, the text writing function means the function of enabling inputs of all texts (e.g., language of the country in which the mobile terminal 100 is released, English, numerals, special characters, symbols, etc.). In particular, the text writing function can be included in at least one of a memo function, an email function, a messenger function, a message function, a document function, a schedule function and the like.

Referring to FIG. 25 (a), if the locked screen is unlocked and the communication with the external device 700 is connected by the processes shown in FIGS. 5 to 17, the controller 180 searches functions provided to the mobile terminal 100 for at least one function interworkable with the external device 700 and then displays a function item indicating the found at least one function on the unlocked screen 210B.

If the function item 350 providing the text writing function is selected from the displayed function items, the controller 180 activates the text writing function, displays a keypad UI (user interface) 351 for text inputs in an active screen of the text writing function on the screen of the mobile terminal 100 only [FIG. 25 (b)], and transmits a text display window 352 for displaying texts inputted via the keypad UI 351 to the external device 700 via the wireless communication unit 110 in order for the text display window 352 to be displayed on the external device 700 [FIG. 25 (c)].

Thereafter, if a text input signal for the text input is inputted via the keypad UI 351, the controller 180 transmits the inputted text input signal to the external device 700 in order for the external device 700 to display the corresponding text on the text display window 352 to correspond to the text input signal.

So far, as one embodiment of the process for controlling the operation of the external device 700 in the step S170 shown in FIG. 5, the process for enabling functions to interwork between the mobile terminal 100 and the external device 700 is described in detail with reference to FIGS. 15 to 25.

Meanwhile, as another embodiment of the process for controlling the operation of the external device 700 in the step S170 shown in FIG. 5, the controller 180 can transmit a content of the mobile terminal 100 to the external device 700. In this case, the content may include all data that can run in the mobile terminal 100. For example, the content may include at least one of a broadcast, a video, a music, a photo, a game, a document, a map, a navigation, a menu function, and application, a widget and the like.

In particular, if the locked screen is unlocked and the communication with the external device 700 is connected by the processes shown in FIGS. 5 to 17, the controller 180 searches contents provided to the mobile terminal 100 for at least one content runnable in the external device 700.

In doing so, if the communication with the external device 700 is connected, the controller 180 makes a request for a device information of the external device 700 to the external device 700 via the wireless communication unit 110. If the device information of the external device 700 is received from the external device 700, the controller 180 can search the contents provided to the mobile terminal 100 for the at least one content runnable in the external device 700.

Subsequently, the controller 180 displays a content item indicating the found at least one content on the unlocked screen 210. If a specific content item is selected, the controller 180 transmits the content corresponding to the selected content item to the external device 700 in order for the content to be activated in the external device 700.

In doing so, if the content corresponding to the selected specific item is provided to the external device 700, the controller transmits a signal for commanding an activation of the content to the external device 700 via the wireless communication unit 110. In particular, the controller 180 transmits a signal, which queries whether the content corresponding to the selected specific content item is provided, to the external device 700 via the wireless communication unit 110. If a signal indicating that the content is not provided is received from the external device 700, the controller 180 transmits data of the content to the external device 700. If a signal indicating that the content is provided is received from the external device 700, the controller 180 transmits a signal for commanding an activation of the content to the external device 700.

Moreover, if a specific content item is selected from the unlocked screen 210B, the controller 180 activates the content corresponding to the selected content item and can transmit video and/or audio data of an active screen of the currently active content to the external device 700 by real time via the wireless communication unit 110 in order for the video and/or audio data to be outputted from the external device 700 by real time.

Meanwhile, as another embodiment of the process for controlling the operation of the external device 700 in the step S170 shown in FIG. 5, the controller 180 can transmit a recently used content among contents of the mobile terminal 100 to the external device 700.

In particular, if the locked screen is unlocked and the communication with the external device 700 is connected by the processes shown in FIGS. 5 to 17, the controller 180 searches contents provided to the mobile terminal 100 for at least one recently used content.

In this case, the reference used for the recent use may indicate a predetermined period or a period previously set by a user.

Subsequently, the controller 180 displays a content item indicating the found at least one content on the unlocked screen 210. If a specific content item is selected, the controller 180 transmits the content corresponding to the selected content item to the external device 700 in order for the content to be activated in the external device 700.

In doing so, if the content corresponding to the selected specific item is provided to the external device 700, the controller transmits a signal for commanding an activation of the content to the external device 700 via the wireless communication unit 110. In particular, the controller 180 transmits a signal, which queries whether the content corresponding to the selected specific content item is provided, to the external device 700 via the wireless communication unit 110. If a signal indicating that the content is not provided is received from the external device 700, the controller 180 transmits data of the content to the external device 700. If a signal indicating that the content is provided is received from the external device 700, the controller 180 transmits a signal for commanding an activation of the content to the external device 700.

Moreover, if a specific content item is selected from the unlocked screen 210B, the controller 180 activates the content corresponding to the selected content item and can transmit video and/or audio data of an active screen of the currently active content to the external device 700 by real time via the wireless communication unit 110 in order for the video and/or audio data to be outputted from the external device 700 by real time.

Meanwhile, as another embodiment of the process for controlling the operation of the external device 700 in the step S170 shown in FIG. 5, the controller 180 can transmit a content previously shared with the external device 700 among contents of the mobile terminal 100 to the external device 700.

In particular, if the locked screen is unlocked and the communication with the external device 700 is connected by the processes shown in FIGS. 5 to 17, the controller 180 searches contents provided to the mobile terminal 100 for at least one previously shared content.

In more particular, after communications with external devices have been connected, each time the content of the mobile terminal 100 is shared with the external devices, the controller 180 controls the shared content and a history of the content-shared external device to be saved in the memory 160. If the communication with the external device 700 is connected, the controller 180 searches the contents provided to the mobile terminal 100 for at least one content previously shared with the external device 700 by referring to the history saved in the memory 160.

Subsequently, the controller 180 displays a content item indicating the found at least one content on the unlocked screen 210. If a specific content item is selected, the controller 180 transmits the content corresponding to the selected content item to the external device 700 in order for the content to be activated in the external device 700.

In doing so, if the content corresponding to the selected specific item is provided to the external device 700, the controller transmits a signal for commanding an activation of the content to the external device 700 via the wireless communication unit 110. In particular, the controller 180 transmits a signal, which queries whether the content corresponding to the selected specific content item is provided, to the external device 700 via the wireless communication unit 110. If a signal indicating that the content is not provided is received from the external device 700, the controller 180 transmits data of the content to the external device 700. If a signal indicating that the content is provided is received from the external device 700, the controller 180 transmits a signal for commanding an activation of the content to the external device 700.

Moreover, if a specific content item is selected from the unlocked screen 210B, the controller 180 activates the content corresponding to the selected content item and can transmit video and/or audio data of an active screen of the currently active content to the external device 700 by real time via the wireless communication unit 110 in order for the video and/or audio data to be outputted from the external device 700 by real time.

Meanwhile, after the locked screen of the mobile terminal 100 has been unlocked by the process described with reference to FIGS. 5 to 14, while the communication with the external device 700 is maintained, if the screen of the mobile terminal 100 is locked again, a user can unlock the re-locked screen by inputting one of the touch gestures described with reference to FIGS. 5 to 14 to the re-locked screen.

Moreover, after the locked screens of the mobile terminal 100 and the external device 700 have been unlocked by the process described with reference to FIGS. 5 to 14, while the communication with the external device 700 is maintained, if the screens of the mobile terminal 100 and the external device 700 are locked again, a user can unlock the re-locked screens of the mobile terminal 100 and the external device 700 by inputting one of the touch gestures described with reference to FIGS. 5 to 14 to the re-locked screens of the mobile terminal 100 and the external device 700.

Accordingly, embodiments of the present invention provide various effects and/or features.

First of all, if a screen of a touchscreen is locked, the present invention automatically searches for at least communication-connectable external device and then displays the found at least one external device on the locked screen. Since both of the unlocking of the locked screen and the communication connection to the found external device can be simultaneously performed in response to a user's touch gesture, the user can quickly unlock the locked screen and the communication with the external device can be connected at the same time.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
  a wireless communication unit configured to communicate wirelessly;
  a touchscreen configured to display images and to sense touch; and
  a controller configured to:
    control the touchscreen of the mobile terminal to display a locked screen;
    control the wireless communication unit to search for one or more external devices capable of wireless communication with the wireless communication unit;
    control the touchscreen of the mobile terminal to display a first item and a second item on the locked screen, the first item indicating an external device identified by the search and the second item for unlocking the locked screen; and
    control the touchscreen of the mobile terminal to unlock the locked screen and control the wireless communication unit to establish a wireless communication connection with the identified external device when the first item and second item are touched and a distance between the touched first item and second item is decreased less than a predetermined distance;

determine a cooperative function with the identified external device;

control the touchscreen of the mobile terminal to display a function item indicating the cooperative function after unlocking the locked screen; and execute the cooperative function in response to a user selection of the function item.

2. The mobile terminal of claim 1, wherein:
the controller is further configured to control the touchscreen of the mobile terminal to unlock the locked screen and control the wireless communication unit to establish a wireless communication connection with the identified external device in response to a touch input that is based on a motion of a first touch sensed via the touchscreen.

3. The mobile terminal of claim 2, wherein:
the touch input is further based on a path of the motion.

4. The mobile terminal of claim 3, wherein:
the path selects the identified external device by at least contacting the first item, approaching within a predetermined distance of the first item, or designating a region that includes the first item.

5. The mobile terminal of claim 2, wherein:
the touch input is further based on a motion of a second touch sensed via the touchscreen of the mobile terminal.

6. The mobile terminal of claim 1, wherein:
the controller is further configured control the touchscreen of the mobile terminal to unlock the locked screen and control the wireless communication unit to establish a wireless communication connection with the external device in response to a touch input that is based on two touches sensed via the touchscreen of the mobile terminal.

7. The mobile terminal of claim 6, wherein:
the two touches are concurrent.

8. The mobile terminal of claim 1, wherein the controller is further configured to:
control the touchscreen of the mobile terminal to display at least a third item on the locked screen, the at least the third item corresponding to one or more additional external devices resulting from the search; and
control the wireless communication unit to establish a wireless communication connection with at least one of the additional external devices.

9. The mobile terminal of claim 1, wherein the controller is further configured to:
control the touchscreen of the mobile terminal to display the second item in response to a first touch sensed via the touchscreen; and
control the touchscreen of the mobile terminal to stop displaying the second item in response to the first touch being removed from the touchscreen.

10. The mobile terminal of claim 1, wherein the controller is further configured to:
control the wireless communication unit to receive information related to a touch sensed via a touchscreen of the external device; and
control the touchscreen of the mobile terminal to unlock the locked screen and control the wireless communication unit to establish a wireless communication connection with the external device in response to a touch input that is based on the touch sensed via the touchscreen of the external device and a touch sensed via the touchscreen of the mobile terminal.

11. The mobile terminal of claim 10, wherein:
the touch input is further based on timing of the touch sensed via the touchscreen of the mobile terminal and the touch sensed via the touchscreen of the external device.

12. The mobile terminal of claim 10, wherein:
the touch input is further based on a motion of the touch sensed via the touchscreen of the mobile terminal and a motion of the touch sensed via the touchscreen of the external device.

13. The mobile terminal of claim 1, wherein the controller is further configured to control the wireless communication unit to perform the search while the lock screen is displayed.

14. The mobile terminal of claim 1, further comprising a camera,
wherein the cooperative function includes a camera function in which the controller activates the camera and controls the wireless communication unit to transmit a preview image received from the camera to the identified external device.

15. The mobile terminal of claim 1, wherein:
the cooperative function includes a camera function in which the controller controls the wireless communication unit to transmit a signal to the identified external device, the signal including a request for transmission of a preview image received from a camera of the external device; and
the controller is further configured to control the touchscreen of the mobile terminal to display the preview image received from the identified external device.

16. The mobile terminal of claim 1, wherein the cooperative function includes a memo function in which the controller controls the wireless communication unit to transmit a signal commanding the identified external device to operate in a memo writing mode when the mobile terminal is connected to a call with a counterpart, to receive written memo content from the identified external device, and to transmit the received memo content to the counterpart.

17. The mobile terminal of claim 1, further comprising a camera,
wherein the cooperative function includes a video call function in which the controller controls the wireless communication unit to transmit a counterpart image to the identified external device, the counterpart image being an image of a video call between the mobile terminal and a counterpart.

18. The mobile terminal of claim 1, wherein the controller is further configured to:
control the touchscreen of the mobile terminal to display content usable by the identified external device after the wireless communication connection is established;
determine a selection of the content; and
control the wireless communication unit to transmit the selected content to the identified external device in response to the selection.

19. The mobile terminal of claim 18, wherein the content includes at least recently used content or content previously shared with the identified external device.

20. A method of controlling a touchscreen of a mobile terminal, the method comprising:
displaying a locked screen on the touchscreen;
searching for one or more external devices capable of wireless communication with the mobile terminal;

displaying a first item and a second item on the locked screen, the first item indicating an external device identified by the search and the second item for unlocking the locked screen;

unlocking the locked screen and establishing a wireless communication connection with the identified external device when the first item and second item are touched and a distance between the touched first item and second item is decreased less than a predetermined distance;

determining a cooperative function with the identified external device;

displaying a function item on the touchscreen indicating the cooperative function after unlocking the locked screen; and executing the cooperative function in response to a user selection of the function item.

21. The method of claim 20, further comprising:

displaying content usable by the identified external device on the touchscreen after the wireless communication connection is established;

determining a selection of the content; and transmitting the selected content to the identified external device in response to the selection.

* * * * *